US012811806B2

(12) United States Patent
Pfaff et al.

(10) Patent No.: US 12,811,806 B2
(45) Date of Patent: Nov. 24, 2026

(54) SUBSTREAM DEPENDENCIES IN A TRUSTWORTHINESS CHECK OF A VIDEO DATA STREAM

(71) Applicant: Fraunhofer-Gesellschaft zur Foerderung der angewandten Forschung e.V., Munich (DE)

(72) Inventors: Jonathan Pfaff, Berlin (DE); Tobias Hinz, Berlin (DE); Karsten Sühring, Berlin (DE); Heiko Schwarz, Berlin (DE); Robert Skupin, Berlin (DE); Yago Sánchez De La Fuente, Berlin (DE); Cornelius Hellge, Berlin (DE); Thomas Schierl, Berlin (DE); Detlev Marpe, Berlin (DE); Thomas Wiegand, Berlin (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 19/449,204

(22) Filed: Jan. 14, 2026

(65) Prior Publication Data

US 2026/0205306 A1 Jul. 16, 2026

(30) Foreign Application Priority Data

Jan. 15, 2025 (EP) .................................... 25152117

(51) Int. Cl.
*H04L 9/32* (2006.01)
*H04L 9/06* (2006.01)
(Continued)

(52) U.S. Cl.
CPC .......... *H04L 9/3247* (2013.01); *H04L 9/0643* (2013.01); *H04N 19/159* (2014.11); *H04N 19/60* (2014.11)

(58) Field of Classification Search
CPC ... H04L 9/3247; H04L 9/0643; H04N 19/159; H04N 19/60
See application file for complete search history.

(56) References Cited

U.S. PATENT DOCUMENTS 6,959,384 B1 * 10/2005 Serret-Avila .......... H04L 9/3236 713/168
7,917,763 B2 3/2011 Kulessa et al.
(Continued)

FOREIGN PATENT DOCUMENTS

AU 2025202309 A1 10/2025
AU 2025202327 A1 10/2025
(Continued)

OTHER PUBLICATIONS

Digital signatures for trustworthy authentication of elementary video streams (Year: 2025).*
(Continued)

*Primary Examiner* — Bryan Y Lee
(74) *Attorney, Agent, or Firm* — ASHURST PERKINS COIE US LLP; Michael A. Glenn

(57) ABSTRACT

An apparatus for checking a video data stream on trustworthiness derives a number of substreams of a predetermine temporal segment out of a sequence of temporal segments, in units of which the video data stream is checkable on trustworthiness, and further derives dependency information, which indicates, for the substream, whether the substream is dependent or whether the substream depends on one or more reference substreams. The trustworthiness check is performed by forming a verification stream based on a hash value, which is obtained from a portion of the substream to be verified and based on a reference hash value. If the substream is independent, a hash value derived for a
(Continued)

corresponding substream of the preceding temporal segment is used as the reference hash value.

18 Claims, 7 Drawing Sheets

(51) Int. Cl.
*H04N 19/159* (2014.01)
*H04N 19/60* (2014.01)

(56) References Cited

U.S. PATENT DOCUMENTS

| | | | | |
|---|---|---|---|---|
| 11,449,584 | B1 | 9/2022 | Pamucci | |
| 11,770,260 | B1 | 9/2023 | Pamucci | |
| 2006/0047967 | A1* | 3/2006 | Akhan | H04N 5/76 713/181 |
| 2006/0136728 | A1 | 6/2006 | Gentry et al. | |
| 2012/0124381 | A1* | 5/2012 | Kim | H04L 9/0643 713/176 |
| 2012/0287989 | A1 | 11/2012 | Budagavi et al. | |
| 2014/0098895 | A1 | 4/2014 | Wang | |
| 2014/0304515 | A1* | 10/2014 | Feuerman | H04L 63/123 713/176 |
| 2016/0080742 | A1 | 3/2016 | Kirchhoffer et al. | |
| 2016/0219273 | A1 | 7/2016 | Pettersson et al. | |
| 2017/0230339 | A1 | 8/2017 | Xie et al. | |
| 2017/0278212 | A1 | 9/2017 | Fry | |
| 2018/0218753 | A1 | 8/2018 | Hodge et al. | |
| 2019/0028441 | A1 | 1/2019 | Thakkar et al. | |
| 2020/0267404 | A1 | 8/2020 | Levy et al. | |
| 2021/0084329 | A1 | 3/2021 | Venugopal et al. | |
| 2021/0297709 | A1 | 9/2021 | Reitmeyer et al. | |
| 2021/0368173 | A1 | 11/2021 | Taquet et al. | |
| 2021/0368176 | A1 | 11/2021 | Bross et al. | |
| 2022/0217406 | A1 | 7/2022 | Hannuksela | |
| 2022/0368534 | A1 | 11/2022 | Lundberg et al. | |
| 2022/0400300 | A1 | 12/2022 | Blythe et al. | |
| 2023/0020655 | A1 | 1/2023 | Xu et al. | |
| 2023/0070957 | A1 | 3/2023 | Sanjeevan Cabeza | |
| 2024/0048394 | A1 | 2/2024 | Bjorn et al. | |
| 2024/0098292 | A1 | 3/2024 | Wang | |
| 2024/0235847 | A1 | 7/2024 | Jacobson | |
| 2024/0422141 | A1 | 12/2024 | Shade et al. | |
| 2025/0126269 | A1 | 4/2025 | Zhang et al. | |

FOREIGN PATENT DOCUMENTS

| | | | |
|---|---|---|---|
| AU | 2025202329 | A1 | 10/2025 |
| RU | 2015117520 | A | 11/2016 |
| RU | 2820747 | C1 | 7/2024 |

OTHER PUBLICATIONS

"Advanced video coding for generic audiovisual services", H.264/AVC, Aug. 2024, 854 pp.
"High efficiency video coding", H.265/HEVC, Jul. 2024, 728 pp.
"Secure Hash Standard (SHS)", FIPS PUB 180-4, Aug. 2015, 36 pp.
"Versatile video coding", H.266/VVC, Sep. 2023, 538 pp.
Boyce, Jill, "Additional SEI messages for VSEI version 4 (Draft 4)", JVET-AJ2006-v3; Joint Video Experts Team (JVET) of ITU-T SG 16 WP 3 and ISO/IEC JTC 1/SC 29, 36th Meeting: Kemer, TR, 1-8, Nov. 2024, 90 pp.
Suehring, Karsten, "AHG9: Digitally Signed Content Authentication SEI", Joint Video Experts Team (JVET) of ITU-T SG 16 WP 3 and ISO/IEC JTC 1/SC 29 35th Meeting, Sapporo, JP, Jul. 12-19, 2024, Document: JVET-AI0127-v1, published Jul. 5, 2024 < URL: https://www.itu.int/wftp3/av-arch/jvet-site/2024_07_AI_Sapporo/documents/JVET-AI0127-v1.zip> [retrieved on Mar. 11, 2026], Jul. 2024, 10 pp.
Sühring, et al., "Digital signatures for trustworthy authentication of elementary video streams", International Conference on Visual Communications and Image Processing (VCIP) 2025; Downloaded on Jul. 8, 2026 from IEEE Xplore.
Mccarthy, et al., "AHG9: On digitally signed content SEI messages", Joint Video Experts Team (JVET) of ITU-T SG 16 WP 3 and ISO/IEC JTC 1/SC 29; 37th Meeting, Geneva, CH Jan. 14-22, 2025. Document No. JVET-AK0206-v2, 149. MPEG Meeting; Jan. 20, 2025-Jan. 24, 2025; Geneva; (Motion Picture Expert Group or ISO/IEC JTC1/SC29/WG11), Jan. 14, 2025 (Jan. 14, 2025), XP030336880—12 pp.
Boyce, et al., "AHG9: Multilayer 1-15 Inv. digitally signed content authentication SEI messages", 37. JVET Meeting; Jan. 14, 2025-Jan. 22, 2025; Geneva; (The Joint Video Exploration Team of ISO/JTC1/SC29/ WG11 and ITU-T SG. 16 ), Jan. 10, 2025 (Jan. 10, 2025), XP030333000, [retrieved on Jan. 10, 2025], Jan. 2025, 14 pp.
Kim, et al., "AHG9: On signaling and constraint for RefDigest in digitally signed content SEI messages", 149. MPEG Meeting; Jan. 20, 2025-Jan. 24, 2025; Geneva; (Motion Picture Expert Group or ISO/IEC JTC1/SC29/WG11), Jan. 7, 2025 (Jan. 7, 2025), XP030336612, [retrieved on Jan. 7, 2025], Jan. 2025, 6 pp.

* cited by examiner

SUBSTREAM DEPENDENCIES IN A TRUSTWORTHINESS CHECK OF A VIDEO DATA STREAM

CROSS-REFERENCE TO RELATED APPLICATION

This application claims priority from European Application No. 25152117.5, which was filed on Jan. 15, 2025, and is incorporated herein by reference in its entirety.

TECHNICAL FIELD

Embodiments of the invention relate to an apparatus, e.g., a video decoder, for checking a video data stream on trustworthiness, an apparatus, e.g., a video encoder, for rendering a video data stream having a video encoded thereinto checkable on trustworthiness, a method for checking a video data stream on trustworthiness, a method for rendering a video data stream having a video encoded thereinto checkable on trustworthiness, a video, and/or a video data stream.

BACKGROUND OF THE INVENTION

Content Authentication is crucial to avoid media tampering. Rapid AI advancements have sparked the creation of sophisticated deepfakes, blurring the lines between real and fake content and raising significant cybersecurity and copyright concerns. Therefore, being able to verify the authenticity of the media is becoming crucial nowadays.

Examples of methods to carry out such authentication consist in, or include, providing digital signatures for the media by first hashing a media asset and then signing it with the private key of the content generator so that at the client side, given a public key of the content generator, the client can compare the provided signature with the value of a hash computed based on the received media asset by itself. Should the values coincide, the client can safely assume that the media has not been tampered.

Still, it would be desirable, to provide a concept for checking video data streams on trustworthiness, which concept provides an improved tradeoff between a low signaling overhead, a high flexibility in extracting sub-portions of the video data stream, a high reliability of the trustworthiness check, and a low computational load.

SUMMARY

Embodiments of the invention provide an apparatus for decoding a video from a video data stream. The apparatus is configured for checking the video data stream on trustworthiness in units of temporal segments of a sequence of temporal segments of the video data stream. The apparatus is configured for deriving a number of substreams of a predetermined temporal segment of the temporal segments, each of the substreams having a portion of the predetermined temporal segment associated therewith, the number of substreams having an order defined among them; and deriving dependency information, which indicates, for a substream of the number of substreams, whether the substream is independent or whether the substream depends on one or more reference substreams of the substream. The apparatus is configured for checking the substream of the predetermined temporal segment on trustworthiness by obtaining, based on an indication in the video data stream, a digital signature for the substream of the predetermined temporal segment; using a hash function to derive a hash value based on the portion of the predetermined temporal segment which is associated with the substream; and forming a verification string based on the hash value and based on a reference hash value. The apparatus is further configured for checking whether the verification string fits to the digital signature.

According to embodiments of a first aspect of the invention, the apparatus is configured for forming the verification string based on the hash value and based on the reference hash value by, if the substream is independent (e.g., and if, additionally, the predetermined temporal segment is not the first temporal segment of the sequence of temporal segments, and/or if, in a preceding temporal segment, which directly precedes the predetermined temporal segment in the sequence of temporal segments, the corresponding substream is verifiable (e.g., does not carry verification information which renders the corresponding substream of the preceding temporal segment checkable on trustworthiness, e.g., does not carry a digital signature)), using, as the reference hash value, a hash value derived for the corresponding substream of the preceding temporal segment, the preceding temporal segment preceding the predetermined temporal segment in the sequence of temporal segments.

According to embodiments of a second aspect of the invention, if the substream depends on one or more reference substreams out of the number of substreams, the reference hash value is based on a bitstring of bits of a predetermined value, the bitstring having a predetermined length, if the predetermined temporal segment is the first temporal segment of the sequence of temporal segments, and/or if a preceding temporal segment, which directly precedes the predetermined temporal segment in the sequence of temporal segments is unverifiable.

According to embodiments of a third aspect of the invention, if the substream depends on one or more reference substreams out of the number of substreams, the reference hash value is based on a hash value derived for a predetermined substream of a preceding temporal segment, the preceding temporal segment preceding the predetermined temporal segment in the sequence of temporal segments, wherein the predetermined substream corresponds to [e.g., in terms of its rank in the order] one of the following [e.g., the predetermined substream is one of the following]: the lowest ranked substream within a set out of the one or more reference substreams [e.g., which reference substreams are independent], or the highest ranked substream within a set out of the one or more reference substreams [e.g., which reference substreams are independent].

According to embodiments of a fourth aspect of the invention, if the substream depends on one or more reference substreams out of the number of substreams, the reference hash value is based on a combination of hash values derived for a set of substreams of a preceding temporal segment, the preceding temporal segment preceding the predetermined temporal segment in the sequence of temporal segments, wherein the set of substreams consisting of all reference substreams out of the one or more reference substreams, which are independent.

In other words, according to embodiments of the present invention, a video data stream may be rendered checkable on trustworthiness in units of temporal segments of the video data stream, and in units of substreams, also referred to as verification substreams. Rendering the video data stream checkable on trustworthiness in units of the temporal segments provides the advantage that a receiver may start streaming a video data stream at any access point of the video data stream, starting from which, the video data stream as decodable without having received previous segments of the video data stream. Thus, such a trustworthiness check in units of temporal segment provides advantages for streaming scenarios. Furthermore, rendering the video data stream checkable in units of the verification substreams allows an efficient verification of portion of the video data stream, for example, in adaptive streaming scenarios, in which a receiver may select between different representations of the video data stream, or between different video substreams of the video data stream, which, e.g., represent the video data stream at different resolutions, or represent different views of the same video, or which carry the video data stream at different frame rates. For example, a design of the verification scheme that allows a verification in units of substreams provides the possibility to define substreams in a manner that they allow verifying a subset of layers of the video data stream and/or a subset of temporal layers of the video data stream, which may carry the video data stream at different resolutions, frame rates, and/or in terms of different content such as different views. However, when verifying a video data stream in units of temporal segments and in units of substreams, mechanisms are to be provided, which can verify the temporal consistency of the temporal segments, i.e., that the sequence of the temporal segments has not been tampered with, e.g., by deleting a segment or by reordering the segments. Even further, in combination with the verifiability units of substreams, embodiments of the invention provide concepts, which allow the individual verification of substreams, even if further substreams of the data stream are not available to the receiver, and even further, provide concepts, which allow a reliable verification across boundaries of temporal segments even in the case of dependent verification substreams.

According to embodiments of the first aspect of the invention, if the substream is independent (e.g., and if the temporal segment is not the first temporal segment of the sequence of temporal segments and a preceding temporal segment of the temporal segment, which directly precedes the temporal segment in the sequence of temporal segments, is verifiable) the reference hash value is, or is derived based on, a hash value derived for the corresponding substream in the preceding temporal segment, which corresponds to the substream to be verified. For example, this type of forming of the verification string may be applied irrespective of whether the substream is the lowest substream in the order among the substreams. For example, always using the corresponding substream in the preceding temporal segment if the preceding segment is available and verifiable, makes the substream verifiable independent of any further substreams. For example, a receiver, which streams only a video substream of the video data stream, which is verifiable by the verification substream to be currently verified, may verify the substream without the need of determining a hash value for another verification substream, such as a lower end verification substream or without the need of being provided with a hash value which could substitute the derivation of a hash value based on the further, e.g., lower ranked, substream. Accordingly, embodiments according to the first aspect provide a flexible verification scheme for independent substreams, in which the signaling overhead for signaling hash values and/or digital signatures is low.

According to embodiments of the second aspect of the invention, if the substream to be currently verified is a dependent substream, e.g., depends on one or more reference substreams out of the number of substreams of the temporal segment, to which the substream belongs, the reference hash value is determined based on a bitstream of bits of a predetermined value and of a predetermined length, if the temporal segment of the substream, which is to be verified, is the first temporal segment of the sequence of temporal segments or if a preceding temporal segment, or a corresponding substream of the preceding temporal segments, is unverifiable. Embodiments according to the second aspect rely on the idea that using a default bitstream in cases in which the preceding temporal segment is not available or not verifiable, ensures that the verification process does not erroneously yield a negative result only for the reasons that the previous segment is unavailable or not verifiable. Instead, in such a case, a default bitstring is used for the verification.

According to embodiments of the third aspect of the invention, if the substream to be currently verified is a dependent substream, a hash value derived for a predetermined substream of a preceding temporal segment is used for deriving the reference hash value. The predetermined substream corresponds to, e.g., in terms of its rank in the order of substreams, to the lowest ranked or the highest ranked substream within a set out of the one or more reference substreams of the substream to be currently verified. For example, the set may include all independent substreams of the one or more reference substreams. In other words, for example, the hash value of only one of the substreams of the preceding temporal segments may be included in the verification process for the currently verified substream. This reduces the number of hash values, which need to be stored for the verification of the current temporal segment, and also, keeps the number of hash values, which need to be determined, low.

Further embodiments of the invention provide an apparatus for encoding a video into a video data stream. The apparatus is configured for rendering the video data stream checkable on trustworthiness in units of temporal segments of a sequence of temporal segments of the video data stream. The apparatus is configured for obtaining a number of substreams of a predetermined temporal segment of the temporal segments, each of the substreams having a portion of the predetermined temporal segment associated therewith, the number of substreams having an order defined among them. The apparatus is further configured for obtaining dependency information, which indicates, for a substream of the number of substreams, whether the substream is independent or whether the substream depends on one or more reference substreams of the substream. The apparatus is further configured for rendering the substream of the predetermined temporal segment checkable on trustworthiness by: using a hash function to derive a hash value based on the portion of the predetermined temporal segment which is associated with the substream; and forming a verification string based on the hash value and based on a reference hash value. The apparatus is further configured for obtaining a digital signature based on the verification string, and inserting an indication of the digital signature in the video data stream. The verification substream is formed as described with respect to the embodiments according to any of the first, second, third, or fourth aspect of the invention, or any combination of two or more thereof.

Further embodiments of the invention provide a method for decoding a video from a video data stream. The method comprises checking the video data stream on trustworthiness in units of temporal segments of a sequence of temporal segments of the video data stream. The method comprises: deriving a number of substreams of a predetermined temporal segment of the temporal segments, each of the substreams having a portion of the predetermined temporal segment associated therewith, the number of substreams having an order defined among them; and deriving dependency information, which indicates, for a substream of the number of substreams, whether the substream is independent or whether the substream depends on one or more reference substreams of the substream. The method further comprises checking the substream of the predetermined temporal segment on trustworthiness by: obtaining, based on an indication in the video data stream, a digital signature for the substream of the predetermined temporal segment; using a hash function to derive a hash value based on the portion of the predetermined temporal segment which is associated with the substream; forming a verification string based on the hash value and based on a reference hash value; and checking whether the verification string fits to the digital signature. The verification substream is formed as described with respect to the embodiments according to any of the first, second, third, or fourth aspect of the invention, or any combination of two or more thereof.

Further embodiments of the invention provide a method for encoding a video into a video data stream. The method comprises rendering the video data stream checkable on trustworthiness in units of temporal segments of a sequence of temporal segments of the video data stream. The method comprises: obtaining a number of substreams of a predetermined temporal segment of the temporal segments, each of the substreams having a portion of the predetermined temporal segment associated therewith, the number of substreams having an order defined among them; and obtaining dependency information, which indicates, for a substream of the number of substreams, whether the substream is independent or whether the substream depends on one or more reference substreams of the substream. The method further comprises: rendering the substream of the predetermined temporal segment checkable on trustworthiness by: using a hash function to derive a hash value based on the portion of the predetermined temporal segment which is associated with the substream; and forming a verification string based on the hash value and based on a reference hash value; and obtaining a digital signature based on the verification string, and inserting an indication of the digital signature in the video data stream. The verification substream is formed as described with respect to the embodiments according to any of the first, second, third, or fourth aspect of the invention, or any combination of two or more thereof.

BRIEF DESCRIPTION OF THE DRAWINGS

Embodiments of the present disclosure are described in more detail below with respect to the figures, among which.

DETAILED DESCRIPTION OF THE INVENTION

Embodiments of the present invention are now described in more detail with reference to the accompanying drawings, in which the same or similar elements or elements that have the same or similar functionality have the same reference signs assigned or are identified with the same name. In the following description, a plurality of details is set forth to provide a thorough explanation of embodiments of the disclosure. However, it will be apparent to one skilled in the art that other embodiments may be implemented without these specific details. In addition, features of the different embodiments described herein may be combined with each other, unless specifically noted otherwise.

Further, it is noted, that details and features described with respect to a decoder, may equivalently apply to corresponding features of a corresponding encoder and vice versa. Embodiments of the invention described in the following, which may optionally be implemented in, or combined with, the framework described in the section "Video coding schemes", in particular, with respect to FIG. 5 to FIG. 7.

Figure 1:
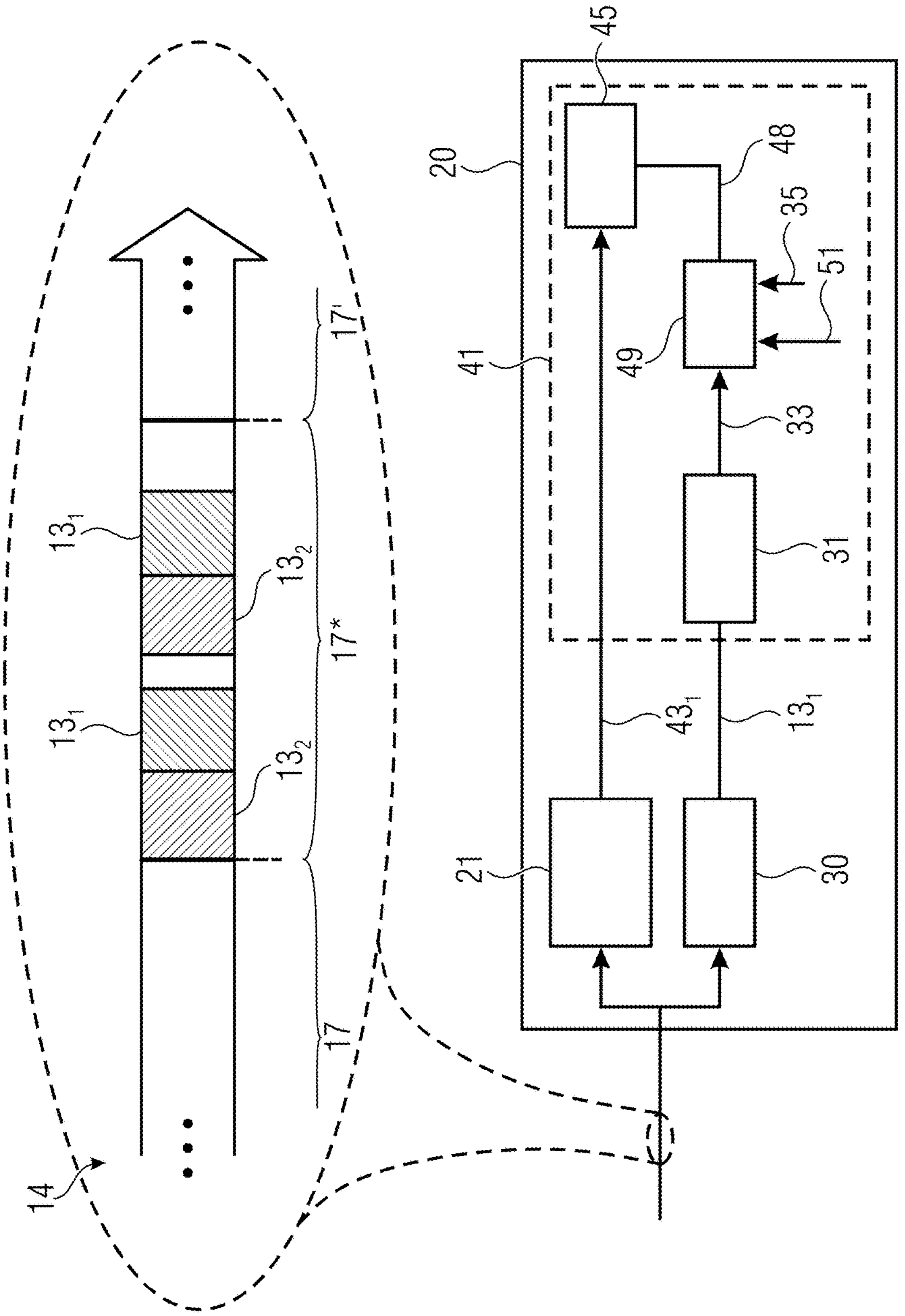
FIG. 1 illustrates an apparatus for decoding a video according to an embodiment.

FIG. 1 illustrates an apparatus 20 for decoding a video from a video data stream 14. Apparatus 20 may be referred as decoder 20. Decoder 20 is configured for checking the video data stream 14 on trustworthiness. For example, checking a video data stream on trustworthiness may refer to verifying that the video data stream, or verifiable portions thereof, were not tampered with or modified, compared to the video data stream as provided or encoded by an entity, which renders the video data stream checkable on trustworthiness, e.g., by providing one or more digital signatures for verifying the trustworthiness of the video data stream. In other words, decoder 20 may verify the video data stream.

Decoder 20 checks the video data stream on trustworthiness in units of temporal segments of a sequence of temporal segments of the video data stream 14. For example, in FIG. 1, three temporal segments 17, 17*, 17'are shown for illustrative purpose. Decoder 20 is configured for deriving a number of substreams of a predetermined temporal segment 17* of the temporal segments. Each of the substreams has a portion of the predetermined temporal segment 17* associated therewith. For example, in FIG. 1, portions 131, 132, are illustrated as being part of the predetermined portion 17 *. The number of substreams has an order, for example, an hierarchical order, defined among them. For example, the order among the substreams may be defined in that decoder 20 performs a verification of the substreams sequentially according to the order from lower to higher rank within the order defined among the substreams. This does not necessarily mean that decoder 20 necessarily checks all of the substreams on trustworthiness, but that decoder 20 may perform the checking according to the order for all substreams of the temporal segment 17* which are checked on trustworthiness.

Decoder 20 derives dependency information 51, which indicates, for a substream, e.g., a substream, which is to be checked on trustworthiness, whether the substream is independent or whether the substream depends on one or more reference substreams of the substream. Decoder 20 checks the substream of the predetermined temporal segment 17' on trustworthiness by obtaining, based on an indication in the video data stream 14, a digital signature for the substream for the predetermined temporal segment 17 *. For illustrative purpose, in FIG. 1, the trustworthiness check of a first substream, which is associated with the portion 131, is illustrated. The digital signature for checking the first substream on trustworthiness is referred to using reference sign 431. Decoder 20 comprises a verification module 41, which performs the trustworthiness of the substream of the predetermined temporal segment based on the portion 131 and the digital signature 431 of a segment.

Verification module 41 uses a hash function 31 to derive a hash value 33 based on the portion 131 of the predetermined temporal segment 17*, which is associated with the substream. Verification module 41 further comprises a verification stream former 49, which forms a verification stream 48 based on the hash value 33 and based on a reference hash value 35. Verification module further comprises a verifier 45, which checks whether the verification string 48 fits to the digital signature 431. For example, verifier 45 may decrypt the digital signature 431 to obtain a check value and check whether the verification string 48 fits to, or matches, the digital signature 431.

In the following, optional details and explanation regarding the verification of the video data stream 14 in units of the temporal segments and in units of the substreams will be described.

As illustrated in FIG. 1, video data stream 14 comprises a sequence of temporal segments. For example, the video data stream may be subdivided into the temporal segments.

According to an embodiment, each of the temporal segments comprises a plurality of access units or time frames of the video data stream 14. For example, all data belonging to one time frame of the video data stream may be referred to as a one access unit.

For example, the temporal segments may be coded video sequences or coded layer video sequences. For example, each of the temporal segments may be decodable in dependent from all further temporal segments of the video data stream 14.

Decoder 20 performs the trustworthiness check of video data stream 14 in units of the temporal segments. For example, decoder 20 may check the temporal segments on trustworthiness sequentially, e.g., according to a temporal order of the temporal segments within the video data stream 14. For example, the temporal order may be equal to an order, in which the temporal segments are signaled in video data stream 14.

Furthermore, within each of the temporal segments, decoder 20 may perform the trustworthiness check in units of the substreams. For example, the substreams may be referred to as verification substreams. In other words, the substreams may be units of the temporal segments, in units of which the video data steam 14 or the temporal segments 17 are verifiable. For example, data stream 14 may signal, for each verifiable portion of the data stream, i.e., for each substream of one of the temporal segments, a respective digital signature, which allows a verification of the respective substream.

In examples, the definition of the substreams may follow a definition of individual streams, which may exist within video data stream 14, such as a substream of video data stream 14 representing a temporal substream, or a selection of a data type, or a subset of layers of the video data stream 14. For example, a temporal substream may be characterized by a temporal resolution, such as a substream including every second time frame. An example for a selection of data may be a selection of 3D views or of the use of a multiview video data stream. In a further example, the definition of the verification substreams may follow the definition of substreams of the video data stream defined by a subset of layers of the video data stream. For example, different layers of the video data stream may represent the video at different resolutions.

For example, decoder 20 may derive the number of substreams by deriving a count of substreams from the video data stream, e.g., an indication, which indicates, how many verifiable substreams the temporal segment contains.

The portions associated with the substreams may include a set of payload packets, e.g., network abstraction layer, NAL, units of the temporal segments. For example, the portions associated with the substreams may include coded video payload packets, e.g., coded video layer, CVL, NAL units, and optionally, a set of supplemental information payload packets, e.g., supplemental enhancement information, SEI, NAL units. For example, the set of supplemental information payload packets included in the portion, which is associated with the substream, may include a subset of all supplemental information payload packets associated with the coded video payload packets of the portion. For example, data stream 14 may include a signalization of the portion associated with a substream. In other words, for determining the portion associated with a substream to be verified, decoder 20 may derive an indication of which portion of the video data stream 14 to include in the portion for the verification of the substream from data stream 14.

As described above, the dependency information indicates, for the substream to be verified, whether the substream is independent. A substream being independent may mean that the substream is independent from the other substreams of the temporal segment, for example, that the substream is verifiable in dependently from the other substreams of the temporal segment. Consequently, a substream being dependent on one or more reference substreams may means that a successful verification of the substream may require information which depends on the one or more reference substreams. For example, considering a layered video data stream, which comprises a layer which depends on a reference layer of the layer, i.e., which requires the reference layer for being decodable. In such a case, a verification substream, which is associated, e.g., which includes, the dependent layer, e.g., the payload packets thereof, may be defined in a manner that it depends on a further verification substream, which is associated with the reference layer, e.g., includes the reference layer, e.g., the payload packets thereof. Reflecting such layer dependencies in the definition of verification substreams allows reusing hash values determined for the reference substreams, such that the amount of data to be hashed and the size of the digital signatures to be transmitted in data steam 14 may be reduced compared to signing all data required for decoding a certain substream of the video data stream individually. The verification 41 illustrated in FIG. 1 may be performed for each or a subset of the substreams of the predetermined temporal segment 17*, although FIG. 1 illustrates the verification only for a first substream.

Extractor 21 derives the digital signature based on an indication in the data stream 14. For example, the digital signature 43 is included in data stream 14, and extractor 21 derives the digital signature from the data stream 14. Alternatively, data stream 14 may indicate a resource from which the digital signature 43 may be derived, and extractor 20 derives the digital signature from the resource.

The description of apparatus 20 of FIG. 1 will now be continued making reference to FIG. 2, with respect to which several embodiments of the verification of a substream will be described.

Figure 2:
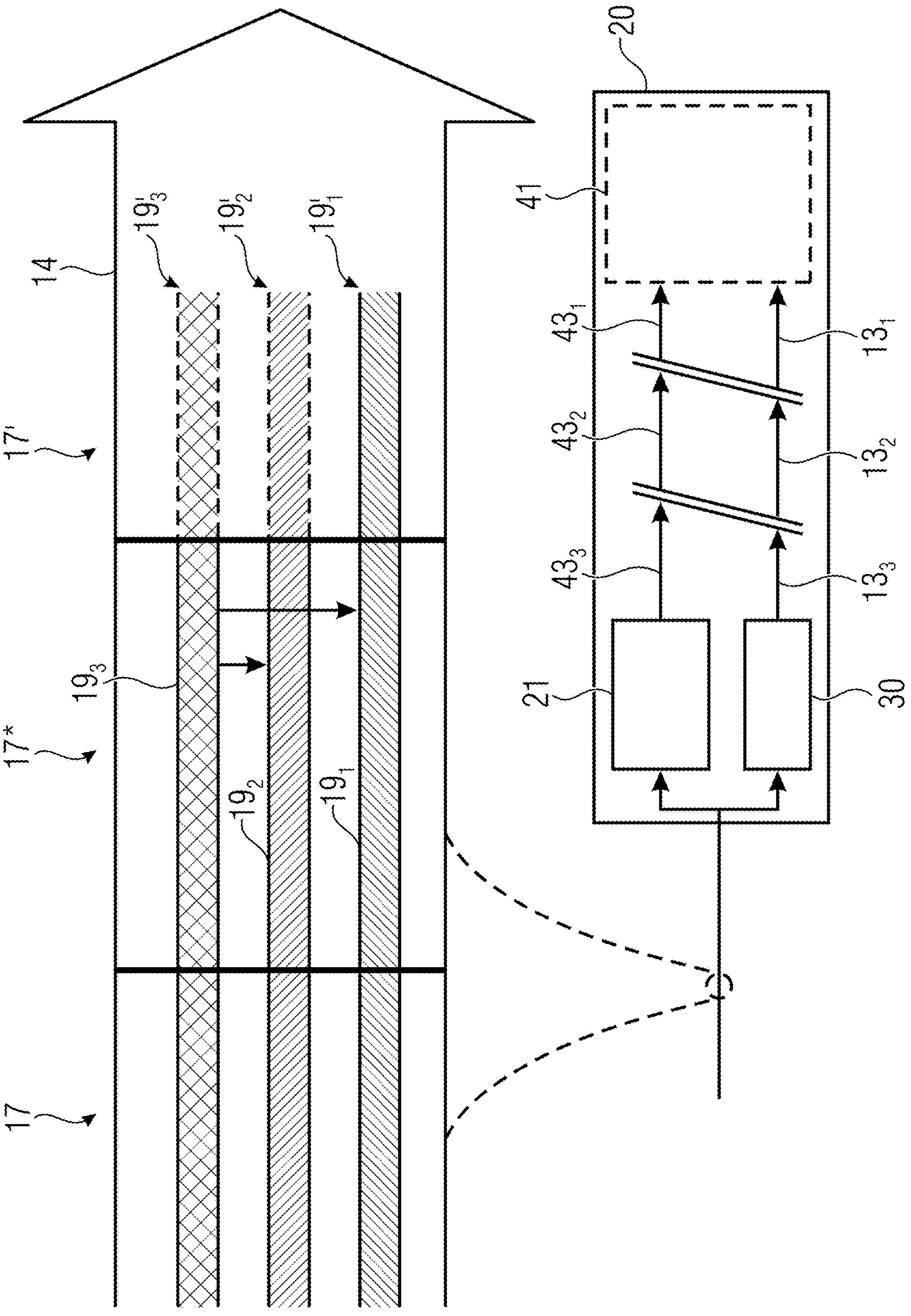
FIG. 2 illustrates substream dependencies according to embodiments.

FIG. 2 shows, for the predetermined temporal segment 17', three substreams $\mathbf{19}_1$, $\mathbf{19}_2$, $\mathbf{19}_3$, with respect to which embodiments of the verification process will be described in the following. It is noted, however, that the specific number of substreams shown in FIG. 2 is chosen for illustrative purpose only, and that the verification processes described in the following are independent of this specific constellation of substreams and substream dependencies shown in FIG. 1.

Rather, the constellation of substreams and substream dependencies of data stream 14 of FIG. 1 has merely illustrative purpose.

For illustrative purpose, the predetermined temporal segment 17* comprises a first substream $\mathbf{19}_1$, which is independent, a second substream $\mathbf{19}_2$, which is independent, and a third substream $\mathbf{19}_3$, which depends on the first substream $\mathbf{19}_1$ and the second substream $\mathbf{19}_2$. In other words, the first substream $\mathbf{19}_1$ and the second substream $\mathbf{19}_2$ are reference substreams of the third substream $\mathbf{19}_3$. For example, the dependency information 51 indicates, for each dependent substream, such as the third substream $\mathbf{19}_3$, the one or more reference substreams, on which the respective substream depends, e.g., in case of the third substream $\mathbf{19}_3$, of FIG. 2, the dependency information may indicate the first substream $\mathbf{19}_1$ and the second substream $\mathbf{19}_2$ as reference substreams of the third substream $\mathbf{19}_3$.

The order defined among the first to third substreams may be from the first substream $\mathbf{19}_1$ to the third substream $\mathbf{19}_3$.

According to an embodiment of the first aspect of the invention, decoder 20 uses, if the substream, which is to be verified, is independent, such as the first substream $\mathbf{19}_1$ in FIG. 2, a hash value derived for the corresponding substream $\mathbf{19}_1$' of the preceding temporal segment 17', which precedes the predetermined temporal segment 17* in the sequence of temporal segments, as the reference hash value 35.

As already mentioned, decoder 20 may sequentially verify the temporal segments according to their temporal order, and within each of the temporal segments, decoder 20 may verify the substreams defined within the respective temporal segment according to the order defined among the substreams. The substreams may extend beyond the borders between the temporal segments, e.g., in the sense that the verification substreams 19 may be associated with, or may comprise the video data of, respective video substreams, as already described above, which video substreams may extend over the plurality of temporal segments. For example, each of the verification substreams 19 may be associated with a substream identifier, which may be universal over the plurality of temporal segments, e.g., in the sense that for each of the temporal segments, a certain substream identifier identifies a substream, which is associated with a certain video substream, which is the same overall temporal segments for the specific substream identifier. However, not each of the temporal segments necessarily includes the same number of verification substreams, but some of the video substreams may be verifiable, while other substreams might be not verifiable, and the verifiability of substreams may change between temporal segments. For example, in FIG. 2, in the preceding temporal segment 17', the first substream $\mathbf{19}_1$' may be verifiable, while the second substream $\mathbf{19}_2$' and the third substream $\mathbf{19}_3$' are not.

When referring to the corresponding substream of the preceding temporal segment, it is referred to, for example, to the substream of the preceding temporal segment 17', which corresponds to the substream, i.e., the one currently verified, in terms of its rank or in terms of a value of a substream identifier, which is universally defined for all of the plurality of temporal segments. In other words, for example, the corresponding substream is the substream of identical rank within the order of substreams compared to the substream to be currently verified, or the substream of identical substream identifiers among the set of all substreams defined within the sequence of temporal segments.

The hash value derived for corresponding substreams, e.g., substream $\mathbf{19}_1$' in FIG. 2, may be derived in the same manner as described for the substream $\mathbf{19}_1$, e.g., based on the portion 131' associated with the first substream $\mathbf{19}_1$'.

In other words, referring to the description of the detailed implementations below, the corresponding substream may be the last, e.g., previously, verified substream with the same substream identifier as the currently verified substream.

According to an embodiment, if the substream to be currently verified is independent, and if the predetermined temporal segment 17* is the first temporal segment of the sequence of temporal segments and/or if in a preceding temporal segment 17', which directly precedes the predetermined temporal segment 17* in the sequence of temporal segments, the corresponding substream is unverifiable, decoder 20 derives the reference hash value 35 using a bitstream of bits of a predetermined value, such as 1 or 0, the bitstream having a predetermined length.

For example, in FIG. 2, the second substream $\mathbf{19}_2$ of the predetermined temporal segment 17* has no verifiable preceding segment, as in the example of FIG. 2, the preceding temporal segment 17' does not carry verification information for the second substream. Accordingly, the corresponding substream $\mathbf{19}_2$' of the second substream $\mathbf{19}_2$ is unverifiable. In other words, a substream being unverifiable may mean that the respective temporal segment does not carry verification information, which renders the corresponding substream of the preceding temporal segment checkable on trustworthiness, e.g., does not carry a digital signature for the respective substream in the respective temporal segment.

In this case, or if the predetermined temporal segment 17* is the first temporal segment, and thus, the preceding temporal segment does not exist, the bitstream of bits of the predetermined value is used.

For example, the predetermined length of the bitstream of bits of the predetermined value may correspond to the length of a hash value, which would be expected, if a hash value for the corresponding substream of the preceding temporal segment existed. For example, the length of the hash value may depend on the hash function 31 to be used for the verification.

For example, the hash function 31 is indicated in data stream 14 for each of the substreams.

Using a default hash value for the case that a hash value of the corresponding substream of the preceding temporal segment does not exist, or in case there is no preceding temporal segment, prevents that the verification fails, i.e., indicates a verification error, which could be interpreted as the data stream being tempered in cases in which a verification of the temporal consistency in terms of the order of temporal segments of the video data stream cannot be performed, e.g., due to the predetermined temporal segment being the first temporal segment or in cases in which the verification chain starts at the predetermined temporal segment.

In general, including the hash value of a corresponding substream of the preceding temporal segment in the verification process as, or as part of, the reference hash value, allows a verification of the temporal consistency of the video data stream in terms that no temporal segments are inserted or deleted, while still allowing a verification in units of the temporal segments. Using the corresponding substream for checking the temporal consistency beyond the borders of the temporal segments allows, e.g., in adaptive streaming scenarios, to extract the independent substream without the need to recalculate digital signatures.

In more general terms, what has been described above, according to an embodiment, decoder 20 in performing the trustworthiness check of a substream of the predetermined temporal segment 17', checks, e.g., using the dependency information 51, whether the substream is independent or whether the substream depends on one or more reference substreams. If the substream is independent, and if the substream is not the first temporal segment of the sequence of temporal segments and/or if the corresponding substream of the substream in the preceding temporal segment is verifiable, decoder 20 uses the hash value derived for the corresponding substream as the reference hash value 35 or as a portion thereof. In other words, in this case, the hash value derived for the corresponding substream, e.g., substream $19_1$' in FIG. 2 for the verification of the first substream $19_1$, is included in the reference hash value 35, which is used for the verification of the substream $19_1$. If the predetermined temporal segment is the first temporal segment, i.e., the preceding temporal segment 17' does not exist, or if the corresponding substream of the substream in the preceding temporal segment 17' is not verifiable, a default hash value may be used instead, included in the reference hash value 35 or used as the reference hash value 35. In the following, embodiments according to a second aspect of the invention will be described, which may relate to the case of dependent substreams, such as e.g., substream $19_3$ of FIG. 2.

According to an embodiment, if the substream to be verified, e.g., substream $19_3$, depends on one or more reference substreams out of the number of substreams of the temporal segment 17', the reference hash value is derived as follows: if the predetermined temporal segment 17* is the first temporal segment of the sequence of temporal segments and/or if the preceding temporal segment 17' is unverifiable, a bitstring of bits of a predetermined value and of a predetermined length, e.g., the bitstring described with respect to the embodiments of the first aspect above, is used for deriving the reference hash value 35, e.g., by including the bitstring as part of the reference hash value 35, or by using the bitstring as the reference hash value 35.

In other words, for example, the above-described usage of a default bitstring as, or as part of, the reference hash value 35, may also be used in case of dependent substreams for cases, in which the verification chain starts at the predetermined temporal segment 17* and in cases in which the preceding temporal segment 17' is not verifiable, for example, in cases in which the corresponding substream of the substream to be verified in the preceding temporal segment is not verifiable and/or in cases in which a lowest ranked or a highest ranked substream out of the reference substreams of the substream to be verified does not have a corresponding substream in the preceding temporal segment 17', which is verifiable. According to embodiments of a third aspect of the invention, if the substream to be verified is a dependent substream, which depends one or more reference substreams, such as the third substream $19_3$ in FIG. 2, decoder 20 determines the reference hash value 35 based on a hash value derived for a predetermined substream of the preceding temporal segment 17'. The predetermined substream of the preceding temporal segment is the lowest ranked substream within a set out of the one or more reference substreams of the substream to be verified, or the highest ranked substream within the set out of the one or more reference substreams.

For example, the set out of the one or more reference substreams, out of which set the predetermined substream is selected, may include all of the one or more reference substreams, or, in alternative embodiments, may include only a subset of the one or more reference substreams, such as only the independent substreams out of the one or more reference substreams.

For example, in FIG. 2, out of the reference substreams of the substream $19_3$, the lowest ranked substream of the preceding temporal segment 17' is the substream $19_1$', and the highest ranked substream is the substream $19_2$'.

For example, the lowest ranked substream out of the reference substreams may always be an independent substream.

In other words, the one or more reference substreams of the set, out of which the predetermined substream is selected may correspond to the one or more reference substreams of the substream to be verified in terms of their ranks in the order defined among the substreams, or in terms of a substream identifier associated with each of the substreams. In other words, the lowest ranked substream, from which the hash value is used for deriving the reference hash value 35, is the substream, which corresponds to the lowest ranked substream out of the one or more reference substreams in the predetermined temporal segment 17*.

In other words, according to embodiments of the second aspect, the predetermined substream is the corresponding substream of the lowest ranked substream $19_1$ within the set out of the one or more reference substreams of the substream to be verified.

Using the predetermined substream, i.e., the lowest ranked one or the highest ranked one, allows for verifying the verification chain over temporal segments in an efficient and robust manner, as only one hash value from the preceding temporal segment may be included. Using the lowest ranked substream as the predetermined substream, has the advantage that the lowest ranked substream may be independent, and thus, the verification process does not depend on higher ranked substreams, which might not have been verified in the preceding temporal segment so that the hash values have not been calculated.

According to embodiments of a fourth aspect, decoder 20 performs the verification of a dependent substream, which depends on one or more reference substreams by deriving the reference hash value 35 based on a combination of hash values derived for a set of substreams of the preceding temporal segment, which set of substreams consists of all reference substreams out of the one or more reference substreams, which are independent. In the following, further optional details will be described, which may be combined with any of the previously described embodiments of any of the first to fourth aspects of the invention, if not explicitly referring to one of the aspects.

For example, the manner of deriving the reference hash value 35 as described above with respect to the embodiments according to the second aspect may be performed in cases, in which the preceding temporal segment 17' exists, i.e., the predetermined temporal segment 17* is not the first temporal segment of the plurality of temporal segments, and the preceding temporal segment 17' being verifiable, at least with respect to the predetermined substream. In other words, if the substream to be verified depends on one or more reference substreams, i.e., is a dependent substream, decoder 20 may derive the reference hash value 35 as follows: If the predetermined temporal segment is the first temporal segment of the plurality of temporal segments or if the preceding temporal segment is not verifiable decoder 20 may include the default bitstring in the reference hash value 35, or in other words, replace the hash value, which would serve for verifying the verification chain over temporal segments by the default bitstring. Otherwise, i.e., in cases, in which the preceding temporal segment exists and is verifiable, at least as far as the predetermined substream is concerned, decoder 20 uses the hash value derived for the predetermined substream of the preceding temporal segment for deriving the reference hash value 35 of the substream to be verified.

It is noted that the embodiments according to the first aspect are combinable with all embodiments according to the second to fourth aspects in that decoder 20 may operate as described with respect to embodiments of the first aspect if the substream to be verified is independent, and decoder 20 may operate as described with respect to any of the embodiments of the first to fourth aspects in case that the substream to be verified is dependent.

According to an embodiment, if the substream to be verified is a dependent substream, decoder 20 derives the reference hash value 35 based on one or more or all of respective hash values derived for the one or more reference substreams of the substream to be verified, i.e., based on one or more or all of respective hash values derived for the one or more reference substreams of the predetermined temporal segment 17'. For example, the reference hash value 35 may be a concatenation of a plurality of hash values, e.g., the one or more or all hash values derived for the one or more reference substreams of the predetermined temporal segment 17* and the hash value of the predetermined substream of the preceding temporal segment 17', if available. If not available, the latter may be replaced by the default bitstring, as described with respect to embodiments of the second aspect.

In other words, the reference hash value 35 may be a concatenation of reference hash values of all reference substreams of the substream to be verified and additionally, a hash value providing a verification of the temporal consistency with respect to the preceding temporal segment 17', if available.

According to an embodiment, decoder 20 uses, as the reference hash value 35, a hash value derived for the highest-ranked substream out of the one or more reference substreams of the substream to be verified.

According to another embodiment, decoder 20 uses, as the reference hash value 35, a concatenation of two or more or all of the respective hash values derived for the one or more reference substreams of the substream of the predetermined temporal segment.

According to another embodiment, if the substream depends on one or more reference substreams, decoder 20 forms the verification string further based on a further hash value. For example, verification string former 94 may form the verification string when concatenating at least, or exactly, the hash value, the further hash value and the reference hash value, e.g., and optionally, further information such as an identifier of the hash method and/or a content identifier of the substream, e.g., as it will be described below.

According to this embodiment, decoder 20 may derive the further hash value based on one or more or all of respective hash values derived for the one or more reference substreams in the predetermined temporal segment.

In other words, according to this embodiment, the above-described reference hash value 35 is the hash value which provides the verification with respect to the preceding temporal segment 17', e.g., the hash value of the predetermined substream or the default bitstring, and the further hash value includes the hash values of the one or more reference substreams of the predetermined temporal segment 17 *. For example, according to this embodiment, the reference hash value 35 may consist of the hash value of the predetermined substream or of the default bitstring.

According to an embodiment, decoder 20 may use as the further hash value a hash value derived for the highest-ranked substream out of the one or more reference substreams of the substream in the predetermined temporal segment 17'.

According to another embodiment, decoder 20 may use, as the further hash value, a concatenation of two or more or all of the respective hash values derived for the one or more reference substreams in the predetermined temporal segment 17*.

In the following, further optional details and features are described which are combinable with any of the embodiments of any of the aspects of the invention described before.

According to an embodiment, decoder 20 derives the hash value 31 by subjecting the portion 13 of the predetermined temporal segment 17*, which portion is associated with a substream 19, to the hash function 31. For example, as illustrated in FIG. 2, for the first substream the first portion 131 is subjected to the hash function 31, for the second substream $\mathbf{19}_2$, the second portion 132 is subjected to the hash function 31, and for the third substream $\mathbf{19}_3$, a third portion 133 of the predetermined temporal segment 13* is subjected to the hash function 31, to derive respective hash values for the verification of the respective substreams.

As it is illustrated in the example of FIG. 2, the number of substreams of the predetermined temporal segment 17* may include a plurality of independent substreams, such as the first and the second substreams $\mathbf{19}_1$, $\mathbf{19}_2$ in FIG. 2.

According to an embodiment, decoder 20 derives the dependency information 51 from the data stream 14.

For example, the dependency information 51 may be included in a syntax structure, e.g., a supplemental information packet, which includes verification information for performing the trustworthiness check of the predetermined temporal segment 17*, e.g., the verification information may include an indication of the count of the number of substreams, an identifier of the hash function, an indication of a certificate comprising a public key for checking the digital signature versus the verification string, and optionally, further information, such as a content identifier.

As an alternative to the above-described embodiments, in which the hash values of the one or more reference substreams are concatenated with the hash value determined for the substream to be verified, according to further embodiments, decoder 20 derives the hash value 33 in cases, in which the substream depends on one or more reference substreams, by subjecting a combination of the portion 13 of the predetermined temporal segment 17*, which is associated with the substream to be verified, and the associated portions of the predetermined temporal segment 17' of the set of one or more or all of the reference substreams of the substream to be verified, to the hash function 31. In other words, according to this embodiment, instead of concatenating individual hash values of the substreams, derived by subjecting portions associated with the respective substreams to the hash function 31, according to this embodiment, the portions are combined, e.g., concatenated and subjected to the hash function 31 jointly.

In the following, further optional features of the verification module 41 are described.

According to an embodiment, verification string former 49 may form a concatenation comprising the hash value 33, and optionally, further information, such as one or more of a media asset identifier, identifying a media asset, to which the media of the predetermined portion 13 belongs, and identifier of an algorithm of the hash function 31, and a further hash value, for example, obtained from a previous portion of the data stream 14. According to this embodiment, verification block 39 comprises a decryption block 59, which decrypts the digital signature 43 to obtain a check value, and verification block 39 checks whether the verification string 48 matches the check value.

According to an embodiment, decryption module 45 may use a public key of an asymmetric cryptography scheme for decrypting the digital signature 43. For example, extractor 21 may derive the public key based on an indication in data stream 14, for example, a resource identifier, which indicates a resource, from which the public key may be derived, and deriving the public key from the resource indicated in data stream 14.

In other words, according to an embodiment, verification module 41 performs the checking whether the hash value 33 fits to the digital signature 43 by forming a verification string based on the hash value and, optionally, based on further information, and comparing the verification string to the digital signature 43 using a public key (wherein comparing the verification string to the digital signature may include the decrypting performed by decrypting block 59).

According to alternative embodiments, all or a part of the above-mentioned further information, which is used for deriving the verification string 48, may be concatenated with the predetermined portion 13 and subjected to the hash function 31 to obtain the hash value 31. In other words, according to these alternative embodiments, all or a part of the further information, e.g., the hash function identifier and/or the further hash value or digital signature of a previous segment or previous portion, is used for deriving the verificaiton string, and is thus reflected in the verification string, by hashing this information together with the predetermined portion 13, and thus, deriving the hash value 33 based on this information.

For example, the generation of the digital signature 43 may be performed on encoder side by forming a verification string and signing it using a private key of an asymmetric encryption scheme.

For example, the singing may include a further hashing, i.e., hashing the verification string using a further hash function to obtain a further hash value and signing the further hash value. In this example, it may be impossible to reconstruct the verification string from the digital signature 43 on decoder side, but instead, it can only be checked, if a check value formed using the hash value 33 fits to the digital signature, e.g., by deriving the check value by forming the verification string and hashing the verification string using the further hash function. In other words, in this case, the verification by verification block 39 may include a hashing of the verification string using the further hash function to obtain a further hash value, and checking, if the further hash value fits to the digital signature, e.g., by decrypting the digital signature using the public key and checking if the resulting check value equals the further hash value.

In other words, according to an embodiment, the checking whether the hash value 33 fits or matches the check value may include forming a verification string using the hash value 33, e.g., by concatenating the hash value 33 with further information, such as a further hash value or a hash function identifier as will be described below, and hashing the verification string, e.g., using a further hash function. Verification block 39 may then check, whether the hashed verification string equals the check value decrypted from the digital signature. On encoder side, according to this embodiment, the digital signature may be generated by forming the verification string as on decoder side, hashing it using the further hash function, and signing the hashed verification string to obtain the digital signature 43.

According to alternative embodiments, the check value may correspond to the verification string, e.g., the hash value 33 or the concatenation of the hash value 33 with further information, such as a further hash value or a hash function identifier. In other words, the decryption of the digital signature in this case may yield the hash value 33 as part of the check value (or the entire check value). In this case, due to the omittance of a further hashing, the digital signature may be larger.

For example, if one or the other of the above alternatives is employed may depend on the selected hash function.

As far as the dependency information 51 is concerned, as already mentioned above, the dependency information 51 may be signaled in data stream 14. For example, data stream 14 may include, for each of the substreams of the predetermined temporal segment 17*, an indication, which indicates whether the respective substream is independent, and if not, one or more reference substreams of the respective substream.

According to an embodiment, the dependency information includes an indication, e.g., a syntax element, e.g., a binary flag, which differentiates between a plurality of modes for signaling the dependency information. The plurality of modes comprises, or consists of a first signaling mode and a second signaling mode. According to the first signaling mode, each substream, which has a rank within the order of substreams higher than the lowest rank within the order, depends on all substreams, which are ranked lower within the order than the respective substream. Accordingly, if the first mode is signaled for the temporal segment, any further signaling of dependencies between substreams in the temporal segment may be omitted, as decoder 20 may infer from the signaling mode that all substreams higher than the lowest-ranked substream are dependent substreams and depend on all lower-ranked substreams. For example, according to the second signaling mode, it is signaled, for each substream individually, if the substream is independent and if not, the one or more reference substreams of the respective substream, e.g., as described above.

According to an embodiment, decoder 20 may switch between a plurality of modes of checking a temporal segment on trustworthiness. For example, the mode may affect the manner in which independent substreams are checked on trustworthiness, e.g., the manner in which independent substreams, which are of a higher rank than the lowest rank in the order of the substreams of the temporal segment currently to be checked on trustworthiness. According to this embodiment, according to a first mode of checking an independent substream on trustworthiness, decoder 20 forms the verification string based on the hash value based on the reference value by, if the substream is independent, using, as the reference hash value, a hash value derived for the corresponding substream of the preceding temporal segment 17'. For example, according to the first mode, this type of forming in the verification string may be performed irrespective of whether the substream is the lowest substream in the order of the substreams. In other words, according to the first mode, irrespective of whether the substream is the lowest substream in the order, the forming of the verification string may be performed, for example, as described with respect to the embodiments of the first aspect above.

According to a second mode of checking the temporal segment on trustworthiness, decoder 20 may form the verification string 48 based on the hash value 31 and based on the reference hash value 35 by using, as the reference hash value, a hash value derived for the next lower-ranked substream of the number substreams according to the order defined among the substreams. For example, this manner of deriving the verification string 48 may apply to independent substreams, which have a rank which is higher than the lowest rank within the order of substreams.

In other words, for an independent substream, which is of a rank higher than the lowest rank, in the first mode, the corresponding substream of the preceding temporal segment may be used as the reference hash value 35, while in the second mode, the hash value of the same temporal segment for the next lower-ranked substream may be used as the reference hash value 35.

According to an embodiment, decoder 20 derives an indication from the data stream 14, which indicates the mode of checking the temporal segment on trustworthiness.

In the following, an apparatus 10 for encoding a data stream 14 is described, which may provide the data stream 14 as described with respect to decoder 20. It is noted that regarding the reference signs the omittance of subscript indices of the reference sign may be understood in the sense that the reference sign, in which the subscript index is omitted may refer to any of the signals referred to with the respective reference sign with any of the indices. For example, when referring to portion 13, the description may refer to any of the portions $13_1$, $13_2$, $13_3$. As it was already described above, the subscript indices refer to the trustworthiness check of the individual substreams such as, the first substream $19_1$ being associated with portion 131 and being verified using digital signature 431.

Figure 3:
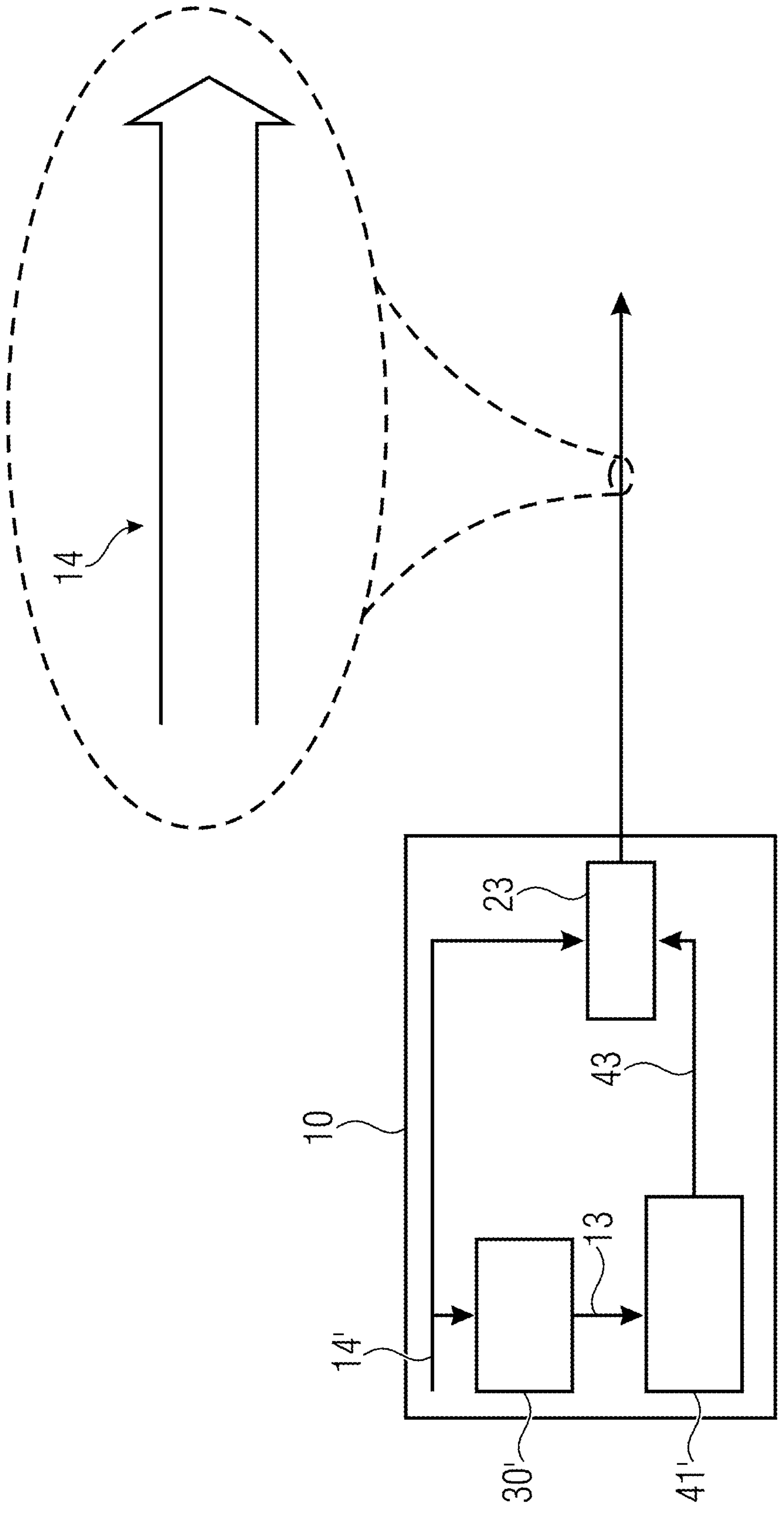
FIG. 3 illustrates an apparatus for encoding a video data stream according to an embodiment.

FIG. 3 illustrates an apparatus 10 for encoding a data stream 14. Apparatus 10 may be referred to as encoder 10. Apparatus 10 is configured for rendering the data stream 14 checkable on trustworthiness. Encoder 10 provides data stream 14 by inserting, e.g., encoding, into the data stream 14, a plurality of payload packets 60 carrying payload data and supplemental information packets 18 carrying supplemental information messages 90. In other words, encoder 10 may provide the data steam 14 as described with respect to FIG. 1. For example, encoder 10 comprises inserter 23, which inserts the payload packets and the supplemental information packets into data stream 14.

Encoder 10 comprises a verification module 41', which obtains a digital signature 43 based on a predetermined portion of the data stream 14. Encoder 10 further comprises a portion determinator 30', which determines the predetermined portion 13. For example, portion determinator 30' determines, based on data 14', which is to be inserted into data stream 14, the predetermined portion 13, e.g., by including a portion of data 14' into the predetermined portion 13, which corresponds to the predetermined portion 13 determined by portion determinator 30.

Any description of apparatus 20 may optionally apply to encoder 10 in the sense that an information derived from data stream 14 by apparatus 20 may be inserted into data stream 14 by apparatus 10. Furthermore, for example, any hash function used by verification module 41 such as hash function 31, may be equivalent to a corresponding hash function used by the verification module 41'. Same applies to the input of corresponding hash functions, such as hash function 31 used for deriving the hash value 33.

The interplay between verification module of decoder 20 and verification module 41' of encoder 10 was already briefly described above. Verification module 41' may for a verification string comprising a hash value derived by subjecting the predetermined portion 13 to a hash function. Verification module 41' may further sign the verification string, e.g., using a private key of the above-mentioned asymmetric cryptography scheme in order to generate the digital signature 43.

For example, the digital signature 43 may be inserted into data stream 14 by inserter 23, alternatively, inserter 23 may insert an indication of a resource, from which the digital signature 43 may be derived, into the data stream 14.

Any description of apparatus 20 may optionally equivalently apply to apparatus 10 in the sense that an information derived from data stream 14 by apparatus 20 may be inserted into data stream 14 by apparatus 10. Furthermore, any hash function such as hash function 31, used by apparatus 10 may be equivalent to the corresponding hash function used by apparatus 20. Same applies to the input of the corresponding hash functions, such as hash function 31 used for deriving hash value 33. The generation of digital signature 43 and the verification performed by apparatus 20 using the digital signature 43, respectively, may be part of an asymmetric cryptography scheme, and these steps may be performed by means of a pair of private and public keys, respectively, wherein at least the private key is used for signing to generate a digital signature 43, and wherein the public key is used for decrypting, in order to verify the verification string formed on receiver side against the digital signature 43.

In the following, further embodiments are described, which may optionally be implemented by a decoder 20 and encoder 10 described above. For example, the following embodiments may be implemented in terms of constraints, which the data stream 14 has to fulfill to be considered or treated as conformant data stream. For example, a constraint on data stream 14 may reduce complexity, as decoder 20 may assume the constraints to be fulfilled, and thus, decoder may infer certain information even if the information is not explicitly signaled in the data stream.

According to an embodiment, encoder 10 obtains the dependency information 51 in a manner that, for each of the substreams, if the respective substream is indicated to be independent, or indicated as not depending on any further one of the substreams, the portion13 of the predetermined temporal segment 17* associated with the respective substream 19 includes an independent layer of the predetermined temporal segment 17* of the video.

For example, as already mentioned above, the video data stream 14 may include one or more layers, e.g., each of which is identified using a respective layer identifier. For example, each of a plurality of sets of layers out of the one or more layers may form an independently decoded video data stream, wherein, for example, each of the sets of layers may comprise one or more of the one or more layers. In other words, there may be a constraint on providing the video data stream 14, which mandates that each of the verification substreams, which is indicated to be independent, carries, or is associated with, an independently decodable layer of the video data stream.

For example, decoder 20 may check, for each of the substreams, which is indicated to be independent, whether the portion of the predetermined temporal segment associated with a respective substream includes an independent layer of the predetermined temporal segment of the video data stream.

For example, if the check performed by decoder 20 yields that there is a substream indicated to be independent, which includes a layer, which is not independent, decoder 20 may treat the video data stream 14 as non-conform. For example, in this case, decoder 20 may reject the video data stream or suppress the verification.

According to another embodiment, encoder 10 obtains the dependency information 51 in a manner that, for each of the substreams 19, if the respective substream, e.g., referred to as substream S1, is indicated to depend on a reference substream, e.g., referred to as substream S0, the portion of the predetermined temporal segment associated with the respective substream S1 includes a layer, e.g., referred to as layer L1, of the predetermined temporal segment of the video data stream, which layer L1 depends on a reference layer, e.g., referred to as layer L0, which layer L0 is associated with a reference substream S0. For example, layer L1 depends on a reference layer L0, which belongs to the portion of the predetermined temporal segment associated with the reference substream S0.

Similarly, according to an embodiment, decoder 20 checks, for each of the substreams, that the respective substream is indicated to depend on a reference substream S0, whether this portion of the predetermined temporal segment associated with the respective substream S1 includes a layer L1 of the predetermined temporal segment of the video data stream, which layer L1 depends on a reference layer L0, which reference layer L0 is associated with a reference substream S0.

Again, if the check is negative, for example, decoder 20 may treat the video data stream as non-conform.

In other words, the dependency of the substreams may reflect the dependencies between layers, e.g., in a manner that a dependent substream is required to include, for each of its reference substreams, a layer, which depends on a reference layer, which is part of the respective reference substream.

According to another embodiment, in cases in which the dependency information 51 for the predetermined temporal segment 17* indicates that more than 1 of the substreams are independent, i.e., the dependency information indicates more than 1 independent substreams, encoder 10 inserts, into the video data stream 14, a content identifier. For example, the content identifier is an identifier associated with a content, e.g., which associates the temporal segment or the substream with a media asset comprising a plurality of media components, e.g., one or more video data streams and one or more audio data streams. Furthermore, encoder 10 forms the verification stream for each independent substream further based on the content identifier. For example, the content identifier is included in the verification stream.

According to an embodiment, encoder 10 inserts, into the video data stream, for each of the independent substreams, a content identifier, which may be the same for each of the substreams, or may be an individual content identifier for each of the substreams. Similarly, according to an embodiment, decoder 20 is configured for, if the dependency information for the predetermined temporal segment indicates that more than 1 of the substreams are independent, deriving, from the video data stream 14, the content identifier. In other words, in case that the temporal segment includes more than 1 independent substream, decoder 20 may expect that the video data stream 14 includes the content identifier, e.g., one content identifier for the temporal segment, or an individual content identifier for each individual substream of the temporal segment. For example, decoder 20 may check, in case that there are more than 1 independent substreams, whether the video data stream includes the content identifier, and if not, treat the video data stream as non-conform, e.g., reject the video data stream or suppress the video data stream. Alternatively, decoder 20 may check, in cases in which a temporal segment includes more than 1 independent substream, whether the video data stream 14 includes, for each of the independent substreams, a respective content identifier, and if not, treat the video data stream as non-conform.

In the following, aspects of the invention are described again in other words, and specific implementations and further embodiments of the invention will be described. The embodiments described with respect to FIGS. 1 to 3 may be considered generalizations of the embodiments described in the following, however, the following description may further contain additional embodiments of the invention, which may be implemented independent of the previously described embodiments. Any of the features and details described with respect to the following embodiments, may optionally be integrated into the previous embodiments.

A trustworthy data exchange is crucial for multimedia, such as in video communications or sharing of video content in the networks. Methods that guarantee robustness and flexibility towards future developments within the field of security relevant hashing and signature algorithms and to easily and individually enable a data transmission from content providers to content consumers that is based on a mutual understanding of trustworthiness between both parties are very important nowadays.

This can be done by including a signature into the video data stream, such as a video data stream, e.g. in the form of SEI messages. The current design for providing signatures into a video data stream in the form of SEI messages is as follows: VCL and some non-VCL NAL units are collected, padded and hashed into a message digest, as indicated by a hash method. For doing so, the NAL units of a coded video sequence is divided in temporal portions or chunks.

Such VCL NAL units of the mentioned temporal portions or chunks can be subdivided into substreams, which is a construct of separating different NAL units for generating different message digests, for instance if they belong to different temporal layers, or 3d views or spatial layers (e.g., grouping of NAL units with different priorities).

Currently substreams are treated differently if they correspond to the:

1) Substream with id equal to 0: The current message digest (for the current temporal portion/chunk) of substream 0 is signed together with the previous message digest (previous temporal portion/chunk) for the substream 0. When the current messages digest is calculated for the first temporal portion/chunk of the video sequence/bitstream, since there is no previous temporal portion/chunk the signing is done together with a sequence of 1-bit digest of a particular size that depends on the hashing mode.
2) Substream with id greater than 0: The current message digest (for the current temporal portion/chunk) of substream greater than 0 is signed together with the message digest (temporal portion/chunk) of the substream with an id one lower than the current message digest.

Note that the signed string is not only the concatenation of the hashes described above but in addition such hash-concatenation is also concatenated with further values such as a hash-method-type value and a unique identifier (optionally) that uniquely identifies a content as specified more concretely below.

The currently specified text is shown in the following:

The verification of the bitstream signature consists of the following ordered steps:

1. The calculation of the message digest referred to as CurrDigest is finalized as follows:

The concatenation of the non-VCL NAL units with a NAL unit type identifier among the values in non VclDigitallySignedNalUnitsList and VCL NAL units for the verification substream with id equal to dscv_verification_substream_id is padded according to the specification in NIST FIPS PUB 180-4. Note that it is sufficient to pad the last NAL unit of the verification substream.

The calculation of the message digest CurrDigest is finalized according to the specification in NIST FIPS PUB 180-4.

2. The reference message digest RefDigest is determined as follows:

If dscv_verification_substream_id is greater than 0, the reference message digest RefDigest is the last calculated message digest for the verification substream with id equal to dscv_verification_substream_id−1. It is a requirement of bitstream conformance that any digitally signed content verification SEI associated with verification substream id equal to dscv_verification_substream_id−1 is present before the digitally signed content verification SEI message with verification substream id equal to dscv_verification_substream_id.

Otherwise, if the current digitally signed content verification SEI message is the first digitally signed content verification SEI with verification id equal to 0 in the coded video sequence and the preceding coded video sequence did not contain any digitally signed content initialization SEI message (this includes the case that the current coded video sequence is the first coded video sequence in the bitstream), the RefDigest is set equal to a bitstring that consists of DigestSize bits equal to 1, where DigestSize is the size of the message digest.

Otherwise, the reference message digest RefDigest is the last calculated message digest for the verification substream with id equal to 0.

Figure 4:
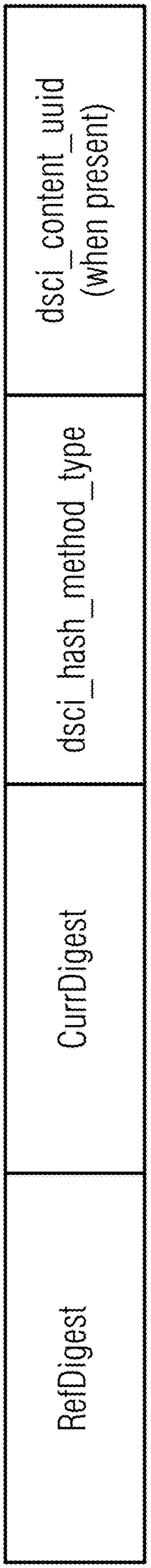
FIG. 4 illustrates a construction of identification stream IdString according to an embodiment.

3. The identification string IdString is constructed by concatenating the binary representations of the reference message digest RefDigest, the current message digest, and the dsci_hash_method_type and, when present, the dsci_content_uuid, as illustrated in the FIG. 4.

The number of bits for RefDigest is determined by the value of dsci_hash_method_type which was valid when calculating the value of RefDigest, the number of bits for CurrDigest is determined by the current value of dsci_hash_method_type, and the value of dsci_hash_method_type is represented with 8 bits and, when present, the value of dsci_content_uuid is represented with 128 bits.

4. The identification string IdString represents the message used for verifying the signature. The signature verification algorithm and the public key used for verifying the signature are indicated by the syntax elements dsci_use_key_register_idx_flag, dsci_key_source_uri, and, if dsci_use_key_register_idx_flag is equal to 1, dsci_key_register_idx.

In layered coding not necessarily, layers are always included in an onion shell manner. That means that actually requiring a substream to be built upon the next lower substream (i.e., the substream with an id 1 lower than the current substream) might not be right. Also, some substreams might not be dependent on a lower substream. Such a dependency property can be derived by an indication specifically done for the substreams or derived from the layers dependencies and a mapping from layers to substreams available in the bitstream. In a first variant of embodiments, the concatenation of hashes of different substreams is signed (e.g., as explained below). This concatenation could be of a current substream and a further substream with the highest substream id among the substreams that the current substream depends on, or it could be of the current substream and more than one (e.g. all) substreams that the substream the current substream depends on. Alternatively, a second variant of embodments could be to gather VCL and non-VCL NAL units of a particular substream and substreams on which the particular substream depends on (or simply indicated as needed for signing), and compute the hash on all these VCL and non-VCL NAL units. The difference would imply that only one signature needs to be checked (since NAL units from all needed substreams are involved in the signature) in comparison with the other approach where more than one signatures need to be checked (since only NAL units of a substream and one lower substream are involved in generating the signature).

For any of the two variants, the following embodiments are described.

In a first embodiment, e.g., according to the first variant, the signaling of substream dependency is used to derive/indicate whether and which substreams are dependent and which are not dependent on lower substreams. For the substreams that are independent, the signature is to be done/checked so that a currentDigest is concatenated with a previousDigest of the same substream id of a previous time interval/temporal portion/chunk.

The second step shown above is modified as follows:

2. The reference message digest RefDigest is determined as follows:

If for dscv_verification_substream_id there is one or more reference substreams, the reference message digest RefDigest is the last calculated message digest for the verification substream with the highest id among reference substream. It is a requirement of bitstream conformance that any digitally signed content verification SEI associated with verification substream id equal to dscv_verification_substream_id−1 is present before the digitally signed content verification SEI message with verification substream id equal to dscv_verification_substream_id.

Otherwise, if the current digitally signed content verification SEI message is the first digitally signed content verification SEI with dscv_verification_substream_id (for which there is no reference substream) in the coded video sequence and the preceding coded video sequence did not contain any digitally signed content initialization SEI message (this includes the case that the current coded video sequence is the first coded video sequence in the bitstream), the RefDigest is set equal to a bitstring that consists of DigestSize bits equal to 1, where DigestSize is the size of the message digest.

Otherwise, the reference message digest RefDigest is the last calculated message digest for the verification substream with dscv_verification_substream_id (for which there is no reference substream).

As a further embodiment, the signaling of substream dependency is used to derive/indicate for a dependent substream (substream with further substreams indicated as reference) a dependee substream (e.g., reference substream), which is the highest substream on which the current substream depends on, and that is used to generate a string that is signed. The signature is to be done/checked so that a currentDigest is concatenated with a previousDigest of the substream id which is the highest substream on which the current substream depends on.

As a further alternative embodiment, the signaling of substream dependency is used to derive/indicate for a dependent substream (substream with further substreams indicated as reference) one or more dependee substream (e.g., reference substream), which consist of all substream on which the current substream depends on, and that are used to generate a string that is signed. The signature is to be done/checked so that a currentDigest is concatenated with all previousDigest of the substreams that the current substream depends on.

As an alternative embodiment to the first variant, when the message digest are not built as a simple concatenation of hashes but a collection of NAL Units of a current substream and substreams on which the current substream depends (e.g., referred to as reference substreams) on (e.g., according to the second of the above-mentioned variants), the following may be done. A string to be signed is generated as a currentDigest which is the collection of Units or a current substream and:

1) the substreams with highest substream id on which the current substream depends on
2) All the substreams on which the current substream depends on For any of the two variants, when a substream depends of other substream, a further reference Digest is used to generate the string that is signed, for which the described one or more hashes and the further ReferenceDigest are concatenated. The further ReferenceDigest being one or more of the following:

1) A bitstring of 1-bit of a length dependent on the hash type indicated
2) The hash value (currDigest of previous temporal portion) of the lowest substream id among the reference substreams, which do not depend on any substream, of the current substream
3) The hash value (currDigest of previous temporal portion) of the highest substream id among the reference substreams, which do not depend on any substream, of the current substream
4) The hash values (currDigest of previous temporal portion) of the all substream id among the reference substreams, which do not depend on any substream, of the current substream For the option described in the bullet point 2) above "The hash value (currDigest of previous temporal portion) of the lowest substream id among the reference substreams, which do not depend on any substream, of the current substream" the modifications to the process are shown as example (assuming that the currDigest is concatenated with the digest messages of all substream that the current substream depends on):

1. The calculation of the message digest referred to as CurrDigest is finalized as follows:
   The concatenation of the non-VCL NAL units with a NAL unit type identifier among the values in non VclDigitallySignedNalUnitsList and VCL NAL units for the verification substream with id equal to dscv_verification_substream_id is padded according to the specification in NIST FIPS PUB 180-4. Note that it is sufficient to pad the last NAL unit of the verification substream.
   The calculation of the message digest CurrDigest is finalized according to the specification in NIST FIPS PUB 180-4.
   If for dscv_verification_substream_id there is one or more reference substreams, the curDigest is concatenated with all curDigest of the reference substreams (Or, alternatively, with currDigest of the reference substream having the highest dscv_verification_substream_id).
2. The reference message digest RefDigest is determined as follows:
   If for dscv_verification_substream_id there is one or more reference substreams, the reference message digest RefDigest is the previously calculated message digest for the verification substream with a dscv_verification_substream_id equal to the lowest id that the current substream depends on, with the previously calculated message digest referring to the calculated message for a dscv_verification_substream_id equal to the lowest id that the current substream depends on preceding the currDigest of the same dscv_verification_substream_id (i.e., the currDigest of the dscv_verification_substream_id equal to the lowest id that the current substream depends on of the preceding temporal portion).
   Otherwise, if the current digitally signed content verification SEI message is the first digitally signed content verification SEI with dscv_verification_substream_id (for which there is no reference substream) in the coded video sequence and the preceding coded video sequence did not contain any digitally signed content initialization SEI message (this includes the case that the current coded video sequence is the first coded video sequence in the bitstream), the RefDigest is set equal to a bitstring that consists of DigestSize bits equal to 1, where DigestSize is the size of the message digest.
   Otherwise, the reference message digest RefDigest is the last calculated (i.e., e.g., for the preceding coded video sequence) message digest for the verification substream with dscv_verification_substream_id (for which there is no reference substream).

In a further embodiment, the dependency indication described above has a mode for which a default dependency can be derived in which a substream id (greater than 0) depends on all lower substream ids.

As a further embodiment, above one or more or all of the following constraints need be fulfilled when substream dependencies are indicated. For example, the following constraints may be embodiments of the above-described embodiments making use of bitstream constraints.

1) When a substream does not depend on any substream there shall be a layer belonging to such substream that is an independent layer
2) When a substream (e.g. substream 1) depends on another substream (e.g., substream 0) there shall be a layer (e.g., layer 1) belonging to such dependent substream (1) that depends on a layer (e.g., layer 0) belonging to the substream (0) on which the dependent layer depends.
3) When there is more than one substream that does not depend on any other substream the UUID that is added to the bitstring to produce the signature shall be present in the bitstream.

It is noted that the block diagrams of FIG. 1 to FIG. 3 may alternatively be considered as flow diagrams of respective methods, in which each of the blocks represents a step of the respective method. Thus, what is further disclosed in the above description is:

A method for decoding a video from a video data stream 14, wherein the method comprises checking the video data stream on trustworthiness in units of temporal segments 17;17*;17' of a sequence of temporal segments of the video data stream, wherein the method comprises: deriving a number of substreams $\mathbf{19}_1$;$\mathbf{19}_2$;$\mathbf{19}_3$ of a predetermined temporal segment 17* of the temporal segments, each of the substreams having a portion 131; 132; 133 of the predetermined temporal segment 17* associated therewith, the number of substreams having an order defined among them; and deriving dependency information 51, which indicates, for a substream $\mathbf{19}_1$;$\mathbf{19}_2$;$\mathbf{19}_3$ of the number of substreams, whether the substream is independent or whether the substream depends on one or more reference substreams of the substream. The method further comprises checking the substream of the predetermined temporal segment on trustworthiness by: obtaining 21, based on an indication in the video data stream, a digital signature $\mathbf{43}_1$;43;$\mathbf{43}_3$ for the substream of the predetermined temporal segment 17*; using a hash function 31 to derive a hash value 33 based on the portion $\mathbf{13}_1$; $\mathbf{13}_2\mathbf{13}_3$ of the predetermined temporal segment which is associated with the substream $\mathbf{19}_1$;$\mathbf{19}_2$;$\mathbf{19}_3$; forming a verification string 48 based on the hash value 33 and based on a reference hash value 35; and checking whether the verification string fits to the digital signature. The verification string is formed by: if the substream is independent, using, as the reference hash value 35, a hash value derived for the corresponding substream $\mathbf{19}_1$' of the preceding temporal segment 17', the preceding temporal segment preceding the predetermined temporal segment in the sequence of temporal segments. Additionally or alternatively, the verification substream is formed by: if the substream $\mathbf{19}_3$ depends on one or more reference substreams out of the number of substreams, the reference hash value is based on one or more of the following:

- if the predetermined temporal segment 17* is the first temporal segment of the sequence of temporal segments, and/or if a preceding temporal segment, which directly precedes the predetermined temporal segment in the sequence of temporal segments is unverifiable, a bitstring of bits of a predetermined value, the bitstring having a predetermined length,
- a hash value derived for a predetermined substream $\mathbf{19'}_1$; $\mathbf{19'}_2$ of a preceding temporal segment 17', the preceding temporal segment preceding the predetermined temporal segment in the sequence of temporal segments, wherein the predetermined substream corresponds to one of the following:
  - the lowest ranked substream 19;' within a set out of the one or more reference substreams,
  - the highest ranked substream $\mathbf{19}_2$' within a set out of the one or more reference substreams,
- a combination of hash values derived for a set of substreams of a preceding temporal segment, the preceding temporal segment preceding the predetermined temporal segment in the sequence of temporal segments, wherein the set of substreams consisting of all reference substreams out of the one or more reference substreams, which are independent.

A method for encoding a video into a video data stream 14, wherein the method comprises rendering the video data stream checkable on trustworthiness in units of temporal segments 17;17*;17' of a sequence of temporal segments of the video data stream. The method comprises: obtaining a number of substreams $\mathbf{19}_1$;$\mathbf{19}_2$;$\mathbf{19}_3$ of a predetermined temporal segment 17* of the temporal segments, each of the substreams having a portion $\mathbf{13}_1$; $\mathbf{13}_2$;$\mathbf{13}_3$ of the predetermined temporal segment 17* associated therewith, the number of substreams having an order defined among them; and obtaining dependency information 51, which indicates, for a substream of the number of substreams $\mathbf{19}_1$;$\mathbf{19}_2$;$\mathbf{19}_3$, whether the substream is independent or whether the substream depends on one or more reference substreams of the substream. The method further comprises: rendering the substream of the predetermined temporal segment checkable on trustworthiness by: using a hash function 31 to derive a hash value 33 based on the portion $\mathbf{13}_1$; $\mathbf{13}_2$;$\mathbf{13}_3$ of the predetermined temporal segment 17* which is associated with the substream $\mathbf{19}_1$;$\mathbf{19}_2$;$\mathbf{19}_3$; forming a verification string 48 based on the hash value 33 and based on a reference hash value 35; and obtaining a digital signature based on the verification string, and inserting an indication of the digital signature in the video data stream. The verification string is formed by any of the alternatives, or any combination of the alternatives, described with respect to the method for decoding the video data stream.

Video Coding Schemes

The following description of the figures starts with a presentation of a description of an encoder and a decoder of a block-based predictive codec for coding pictures of a video in order to form an example for a coding framework into which embodiments of the present invention may be built in. The respective encoder and decoder are described with respect to FIG. 5, FIG. 6, and FIG. 7. Thereinafter the description of embodiments of the concept of the present invention is presented along with a description as to how such concepts could be built into the encoder and decoder of FIG. 5, and FIG. 6, respectively, although the embodiments described with the subsequent Figures and following, may also be used to form encoders and decoders not operating according to the coding framework underlying the encoder and decoder of FIG. 5, and FIG. 6, and FIG. 7.

Figure 5:
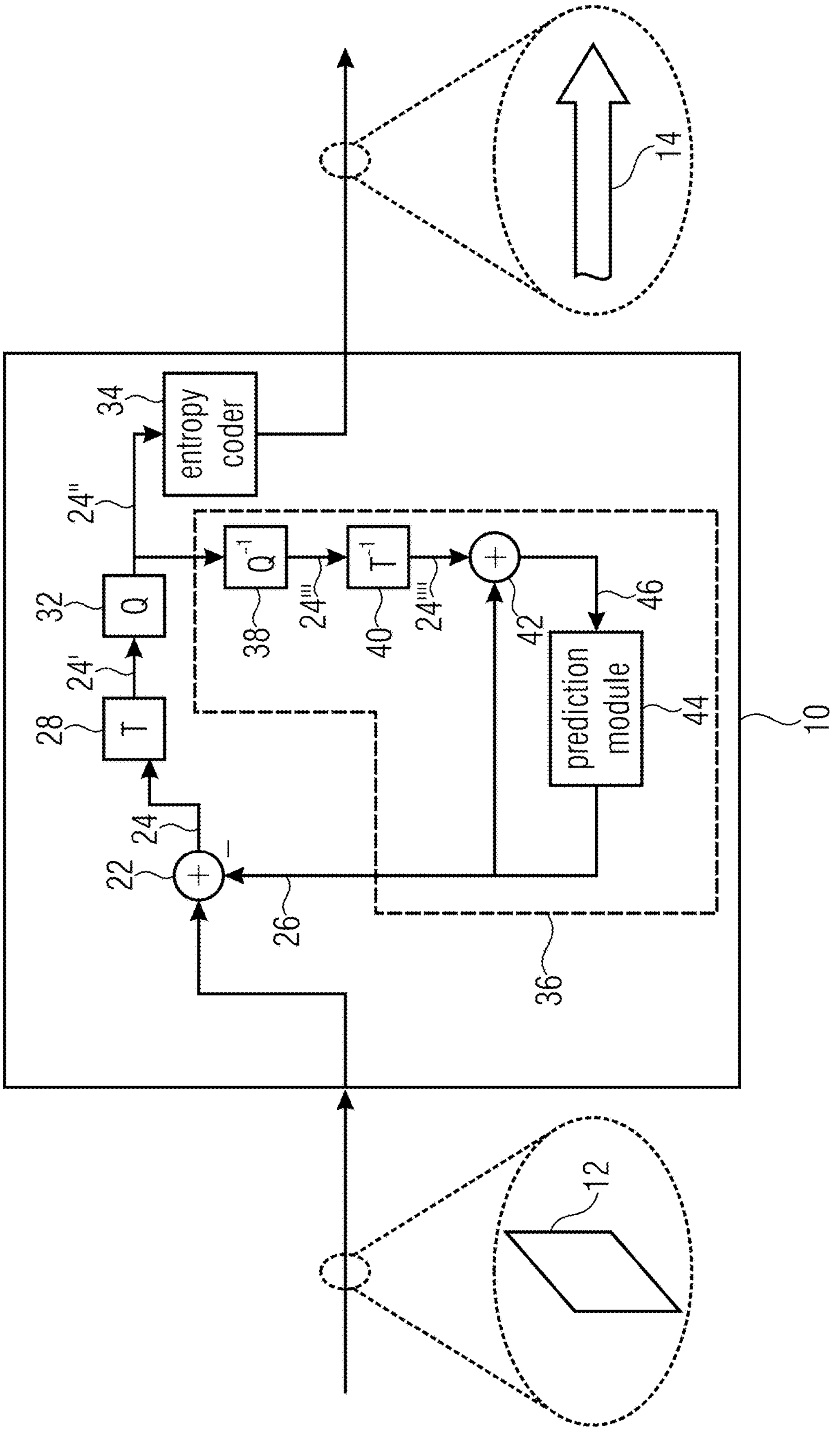
FIG. 5 illustrates an encoder according to an embodiment.
Figure 6:
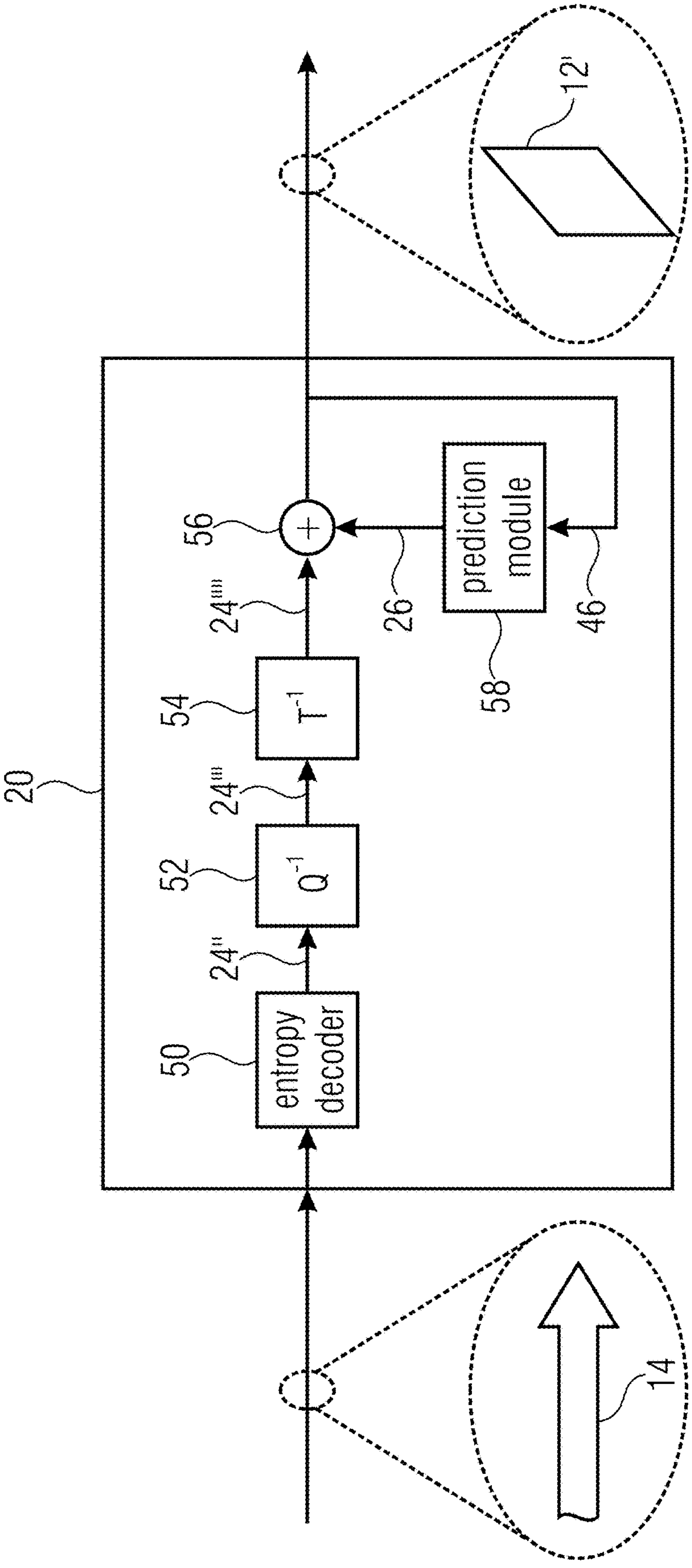
FIG. 6 illustrates a decoder according to an embodiment.

FIG. 5 shows an apparatus for predictively coding a picture 12 into a data stream 14 exemplarily using transform-based residual coding. The apparatus, or encoder, is indicated using reference sign 10. FIG. 6 shows a corresponding decoder 20, i.e. an apparatus 20 configured to predictively decode the picture 12' from the data stream 14 also using transform-based residual decoding, wherein the apostrophe has been used to indicate that the picture 12' as reconstructed by the decoder 20 deviates from picture 12 originally encoded by apparatus 10 in terms of coding loss introduced by a quantization of the prediction residual signal. FIG. 5 and FIG. 6 exemplarily use transform based prediction residual coding, although embodiments of the present application are not restricted to this kind of prediction residual coding. This is true for other details described with respect to FIG. 5, and FIG. 6, too, as will be outlined hereinafter.

The encoder 10 is configured to subject the prediction residual signal to spatial-to-spectral transformation and to encode the prediction residual signal, thus obtained, into the data stream 14. Likewise, the decoder 20 is configured to decode the prediction residual signal from the data stream 14 and subject the prediction residual signal thus obtained to spectral-to-spatial transformation.

Internally, the encoder 10 may comprise a prediction residual signal former 22 which generates a prediction residual 24 so as to measure a deviation of a prediction signal 26 from the original signal, i.e. from the picture 12. The prediction residual signal former 22 may, for instance, be a subtractor which subtracts the prediction signal from the original signal, i.e. from the picture 12. The encoder 10 then further comprises a transformer 28 which subjects the prediction residual signal 24 to a spatial-to-spectral transformation to obtain a spectral-domain prediction residual signal 24' which is then subject to quantization by a quantizer 32, also comprised by the encoder 10. The thus quantized prediction residual signal 24" is coded into bitstream 14. To this end, encoder 10 may optionally comprise an entropy coder 34 which entropy codes the prediction residual signal as transformed and quantized into data stream 14. The prediction signal 26 is generated by a prediction stage 36 of encoder 10 on the basis of the prediction residual signal 24" encoded into, and decodable from, data stream 14. To this end, the prediction stage 36 may internally, as is shown in FIG. 5, comprise a dequantizer 38 which dequantizes prediction residual signal 24" so as to gain spectral-domain prediction residual signal 24'", which corresponds to signal 24' except for quantization loss, followed by an inverse transformer 40 which subjects the latter prediction residual signal 24'" to an inverse transformation, i.e. a spectral-to-spatial transformation, to obtain prediction residual signal 24"", which corresponds to the original prediction residual signal 24 except for quantization loss. A combiner 42 of the prediction stage 36 then recombines, such as by addition, the prediction signal 26 and the prediction residual signal 24"" so as to obtain a reconstructed signal 46, i.e. a reconstruction of the original signal 12. Reconstructed signal 46 may correspond to signal 12'. A prediction module 44 of prediction stage 36 then generates the prediction signal 26 on the basis of signal 46 by using, for instance, spatial prediction, i.e. intra-picture prediction, and/or temporal prediction, i.e. inter-picture prediction.

Likewise, decoder 20, as shown in FIG. 6, may be internally composed of components corresponding to, and interconnected in a manner corresponding to, prediction stage 36. In particular, entropy decoder 50 of decoder 20 may entropy decode the quantized spectral-domain prediction residual signal 24" from the data stream, whereupon dequantizer 52, inverse transformer 54, combiner 56 and prediction module 58, interconnected and cooperating in the manner described above with respect to the modules of prediction stage 36, recover the reconstructed signal on the basis of prediction residual signal 24" so that, as shown in FIG. 6, the output of combiner 56 results in the reconstructed signal, namely picture 12'.

Although not specifically described above, it is readily clear that the encoder 10 may set some coding parameters including, for instance, prediction modes, motion parameters and the like, according to some optimization scheme such as, for instance, in a manner optimizing some rate and distortion related criterion, i.e. coding cost. For example, encoder 10 and decoder 20 and the corresponding modules 44, 58, respectively, may support different prediction modes such as intra-coding modes and inter-coding modes. The granularity at which encoder and decoder switch between these prediction mode types may correspond to a subdivision of picture 12 and 12', respectively, into coding segments or coding blocks. In units of these coding segments, for instance, the picture may be subdivided into blocks being intra-coded and blocks being inter-coded. Intra-coded blocks are predicted on the basis of a spatial, already coded/decoded neighborhood of the respective block as is outlined in more detail below. Several intra-coding modes may exist and be selected for a respective intra-coded segment including directional or angular intra-coding modes according to which the respective segment is filled by extrapolating the sample values of the neighborhood along a certain direction which is specific for the respective directional intra-coding mode, into the respective intra-coded segment. The intra-coding modes may, for instance, also comprise one or more further modes such as a DC coding mode, according to which the prediction for the respective intra-coded block assigns a DC value to all samples within the respective intra-coded segment, and/or a planar intra-coding mode according to which the prediction of the respective block is approximated or determined to be a spatial distribution of sample values described by a two-dimensional linear function over the sample positions of the respective intra-coded block with driving tilt and offset of the plane defined by the two-dimensional linear function on the basis of the neighboring samples. Compared thereto, inter-coded blocks may be predicted, for instance, temporally. For inter-coded blocks, motion vectors may be signaled within the data stream, the motion vectors indicating the spatial displacement of the portion of a previously coded picture of the video to which picture 12 belongs, at which the previously coded/decoded picture is sampled in order to obtain the prediction signal for the respective inter-coded block. This means, in addition to the residual signal coding comprised by data stream 14, such as the entropy-coded transform coefficient levels representing the quantized spectral-domain prediction residual signal 24", data stream 14 may have encoded thereinto coding mode parameters for assigning the coding modes to the various blocks, prediction parameters for some of the blocks, such as motion parameters for inter-coded segments, and optional further parameters such as parameters for controlling and signaling the subdivision of picture 12 and 12', respectively, into the segments. The decoder 20 uses these parameters to subdivide the picture in the same manner as the encoder did, to assign the same prediction modes to the segments, and to perform the same prediction to result in the same prediction signal.

Figure 7:
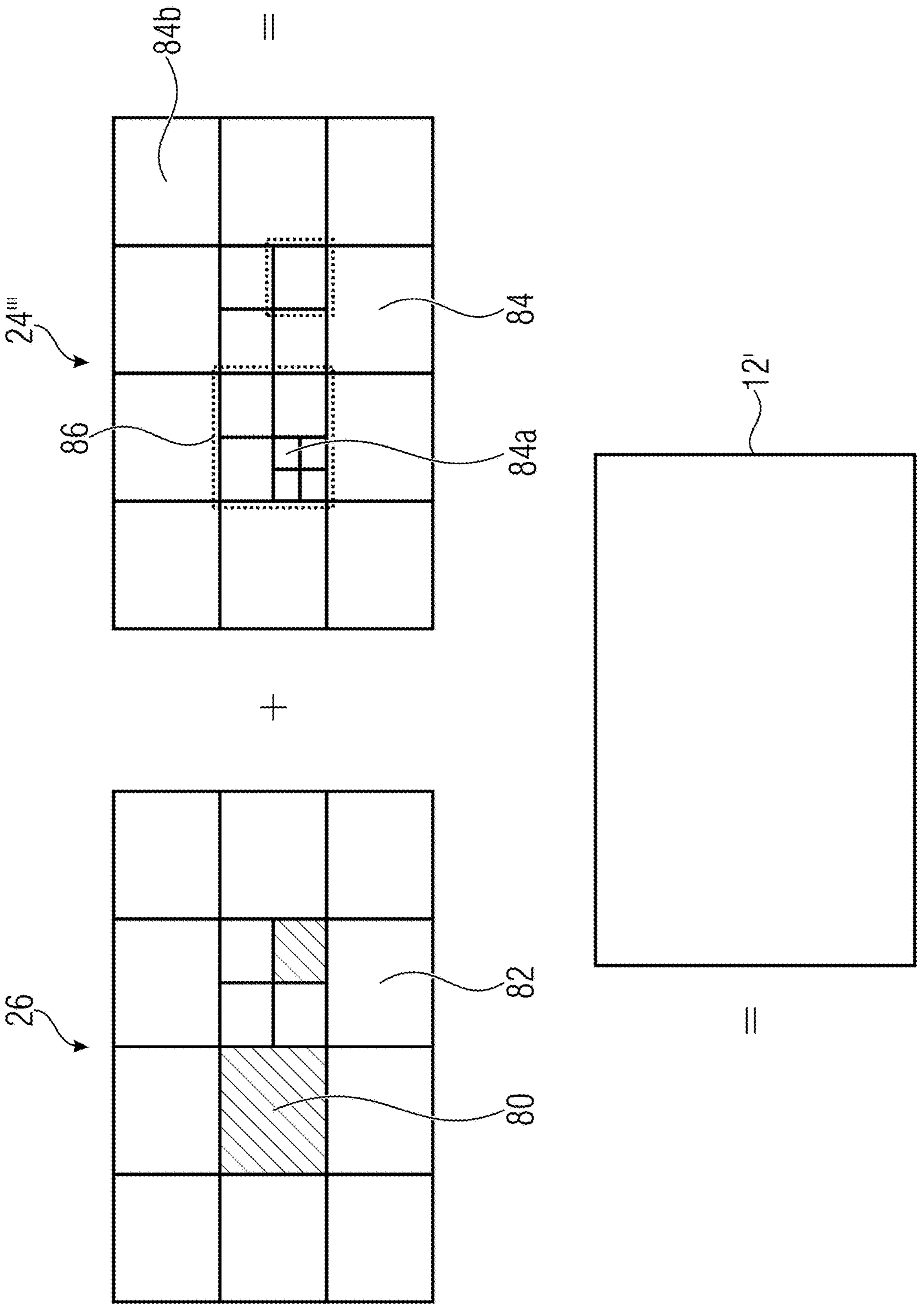
FIG. 7 illustrates sub-divisions of a picture according to an embodiment.

FIG. 7 illustrates the relationship between the reconstructed signal, i.e. the reconstructed picture 12', on the one hand, and the combination of the prediction residual signal 24"" as signaled in the data stream 14, and the prediction signal 26, on the other hand. As already denoted above, the combination may be an addition. The prediction signal 26 is illustrated in FIG. 7 as a subdivision of the picture area into intra-coded blocks which are illustratively indicated using hatching, and inter-coded blocks which are illustratively indicated not-hatched. The subdivision may be any subdivision, such as a regular subdivision of the picture area into rows and columns of square blocks or non-square blocks, or a multi-tree subdivision of picture 12 from a tree root block into a plurality of leaf blocks of varying size, such as a quadtree subdivision or the like, wherein a mixture thereof is illustrated in FIG. 7 in which the picture area is first subdivided into rows and columns of tree root blocks which are then further subdivided in accordance with a recursive multi-tree subdivisioning into one or more leaf blocks.

Again, data stream 14 may have an intra-coding mode coded thereinto for intra-coded blocks 80, which assigns one of several supported intra-coding modes to the respective intra-coded block 80. For inter-coded blocks 82, the data stream 14 may have one or more motion parameters coded thereinto. Generally speaking, inter-coded blocks 82 are not restricted to being temporally coded. Alternatively, inter-coded blocks 82 may be any block predicted from previously coded portions beyond the current picture 12 itself, such as previously coded pictures of a video to which picture 12 belongs, or picture of another view or an hierarchically lower layer in the case of encoder and decoder being scalable encoders and decoders, respectively.

The prediction residual signal 24"" in FIG. 7 is also illustrated as a subdivision of the picture area into blocks 84. These blocks might be called transform blocks in order to distinguish same from the coding blocks 80 and 82. In effect, FIG. 7 illustrates that encoder 10 and decoder 20 may use two different subdivisions of picture 12 and picture 12', respectively, into blocks, namely one subdivisioning into coding blocks 80 and 82, respectively, and another subdivision into transform blocks 84. Both subdivisions might be the same, i.e. each coding block 80 and 82, may concurrently form a transform block 84, but FIG. 7 illustrates the case where, for instance, a subdivision into transform blocks 84 forms an extension of the subdivision into coding blocks 80, 82 so that any border between two blocks of blocks 80 and 82 overlays a border between two blocks 84, or alternatively speaking each block 80, 82 either coincides with one of the transform blocks 84 or coincides with a cluster of transform blocks 84. However, the subdivisions may also be determined or selected independent from each other so that transform blocks 84 could alternatively cross block borders between blocks 80, 82. As far as the subdivision into transform blocks 84 is concerned, similar statements are thus true as those brought forward with respect to the subdivision into blocks 80, 82, i.e. the blocks 84 may be the result of a regular subdivision of picture area into blocks (with or without arrangement into rows and columns), the result of a recursive multi-tree subdivisioning of the picture area, or a combination thereof or any other sort of blockation. Just as an aside, it is noted that blocks 80, 82 and 84 are not restricted to being of quadratic, rectangular or any other shape.

FIG. 7 further illustrates that the combination of the prediction signal 26 and the prediction residual signal 24"" directly results in the reconstructed signal 12'. However, it should be noted that more than one prediction signal 26 may be combined with the prediction residual signal 24"" to result into picture 12' in accordance with alternative embodiments.

In FIG. 7, the transform blocks 84 shall have the following significance. Transformer 28 and inverse transformer 54 perform their transformations in units of these transform blocks 84. For instance, many codecs use some sort of DST or DCT for all transform blocks 84. Some codecs allow for skipping the transformation so that, for some of the transform blocks 84, the prediction residual signal is coded in the spatial domain directly. However, in accordance with embodiments described below, encoder 10 and decoder 20 are configured in such a manner that they support several transforms. For example, the transforms supported by encoder 10 and decoder 20 could comprise:

DCT-II (or DCT-III), where DCT stands for Discrete Cosine Transform

DST-IV, where DST stands for Discrete Sine Transform

DCT-IV

DST-VII

Identity Transformation (IT)

Naturally, while transformer 28 would support all of the forward transform versions of these transforms, the decoder 20 or inverse transformer 54 would support the corresponding backward or inverse versions thereof:

Inverse DCT-II (or inverse DCT-III)

Inverse DST-IV

Inverse DCT-IV

Inverse DST-VII

Identity Transformation (IT)

The subsequent description provides more details on which transforms could be supported by encoder 10 and decoder 20. In any case, it should be noted that the set of supported transforms may comprise merely one transform such as one spectral-to-spatial or spatial-to-spectral transform.

As already outlined above, FIG. 5, FIG. 6 and FIG. 7 have been presented as an example where the inventive concept described further below may be implemented in order to form specific examples for encoders and decoders according to the present application. Insofar, the encoder and decoder of FIG. 5, and FIG. 6, respectively, may represent possible implementations of the encoders and decoders described herein below. FIG. 5, and FIG. 6 are, however, only examples. An encoder according to embodiments of the present application may, however, perform block-based encoding of a picture 12 using the concept outlined in more detail below and being different from the encoder of FIG. 5 such as, for instance, in that same is no video encoder, but a still picture encoder, in that same does not support inter-prediction, or in that the sub-division into blocks 80 is performed in a manner different than exemplified in FIG. 7. Likewise, decoders according to embodiments of the present application may perform block-based decoding of picture 12' from data stream 14 using the coding concept further outlined below, but may differ, for instance, from the decoder 20 of FIG. 6 in that same is no video decoder, but a still picture decoder, in that same does not support intra-prediction, or in that same sub-divides picture 12' into blocks in a manner different than described with respect to FIG. 7 and/or in that same does not derive the prediction residual from the data stream 14 in transform domain, but in spatial domain, for instance.

In the following, embodiments of the invention are described, which may optionally be implemented in, or combined with, the framework described above. with respect to FIG. 5 to FIG. 7.

Embodiments of the invention may optionally embody a specific variant of encoding and decoding video data streams and the related video data stream, which variant is described in the following.

Video decoding according to the specific variant is performed by decoding a video from the video data stream by block-based predictive and transform based residual decoding by decoding prediction residual data of an intra predicted block from the video data stream by use of context-adaptive binary arithmetic decoding by

- decoding a coordinate of a position in a transform block representing the prediction residual data at which position a last non-zero transform coefficient is encountered when traversing transform coefficients of the transform block along a predetermined scan order, and
- sequentially decoding values of transform coefficients including and ranked, along the predetermined scan order, between the last non-zero transform coefficient and a firstly scanned transform coefficient, and
- selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

Video encoding according to the specific variant, is performed by encoding a video into the video data stream by block-based predictive and transform based residual encoding by encoding prediction residual data of an intra predicted block into the video data stream by use of context-adaptive binary arithmetic coding by encoding a coordinate of a position in a transform block representing the prediction residual data at which a last non-zero transform coefficient is encountered when traversing transform coefficients of the transform block along a predetermined scan order, and sequentially encoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

Embodiments of the invention include a video encoder, a video decoder and a method for decoding a video according to the above-described video decoding variant, and a method for encoding a video, and a video data stream as obtained by the respective encoding method according to the above-described video encoding variant.

In the following, further optional details and features of the specific video encoding and video decoding variant of embodiments of the invention are described.

Embodiments of the invention may be compliant to H.265/HEVC. In other words, embodiments relate to an H.265/HEVC decoder, an H.265/HEVC video data stream, a video encoder for providing an H.265/HEVC video data stream.

PCM

The prediction, transform, quantization and entropy coding are bypassed, and the samples are directly represented by a pre-defined number of bits. When PCM is enabled the number of bits (minus1) used for representing the luma and chroma samples is indicated respectively. Besides, the minimum block sizes and maximum block sizes (as a difference to the minimum) for 2N×2N blocks for which PCM can best used are indicated. When a 2N×2N block is being parsed, if the sizes of that block are in between the described minimum and maximum values a flag indicates whether the PCM mode is used or not. When the PCM mode is used the PCM samples are byte aligned and luma samples of the block are directly represented/parsed in raster scan with the indicated PCM luma bit length and afterwards the chroma samples of the PCM block are represented/parsed in raster scan with the indicated PCM chroma bit length, being the first half of the chroma samples Cb and the remaining Cr samples. Furthermore, the CABAC decoding engine is terminated every time PCM flag is parsed and initialized after the decoding PCM syntax Intra Mode Dep. Coeff. Scan Order The scan order of the coefficients in an intra coded block is dynamically changed based on the transform block sizes and intra modes. The scanning is carried out for each 4×4 subblocks/regions of the transform block (e.g., using only one coefficient region for the 4×4 transform block size, 4 coefficient regions for 8×8 transform blocks, 16 regions for 16×16 transform block size). The selection of the scanning method for intra modes is dependent on the transform block sizes. For transform block sizes of 16×16 and 32×32 the scanning is performed diagonally (starting at 0,0->1,0->0, 1->2,0->1,1->0,2->3,0 and so on—e.g. decreasing the y value and increasing the x value with step 1 at each step and when y equals 0 restarting with y having a value of x+1 and setting x to 0 while starting at value 0,0). For transform block sizes of 4×4 (luma or chroma) and 8×8 (luma) the coefficient scanning order depends on the intra mode associated with a intra direction of the prediction of neighboring blocks. The vertical scan is used when the prediction direction is close to horizontal and the horizontal scan is used when the prediction direction is close to vertical. For other prediction directions, the diagonal up-right scan is used.

Transform Quantization Bypass Mode

For each coding unit, or coding block it can be indicated whether both transform and quantization are bypassed indicating that the residual signal from inter-or intra-picture prediction is directly entropy coded for that block. In that mode the in-loop filter is skipped. It is noted that further embodiments may provide an H.264/AVC decoder, an H.264/AVC video data stream, a video encoder for providing an H.264/AVC video data stream, or an H.266/VVC decoder, an H.266/VVC video data stream, a video encoder for providing an H.266/VVC video data stream.

Further Embodiments

It is noted, that details described above may be individually combined with the subject-matter of the following embodiments. Text in brackets represents optional features, explanations, or examples, which may optionally be combined with the embodiments.

1. Apparatus 20 for decoding a video from a video data stream 14, wherein the apparatus is configured for checking the video data stream on trustworthiness [e.g., verifying the video data stream] in units of temporal segments 17;17*;17' [e.g., coded video sequences or coded layer video sequences] of a sequence of temporal segments of the video data stream [e.g., the video data stream being subdivided into the temporal segments, each comprising a plurality of access units (or time frames) of the video data stream], wherein the apparatus is configured for deriving [e.g., from an indication, e.g., a syntax element, in the video data stream] [e.g., checking the temporal segments on trustworthiness in units of substreams] a number of substreams 19$_1$;19$_2$;19$_3$ [e.g., verification substreams, e.g., substreams in portions of which the video data stream is verifiable] of a predetermined temporal segment 17* of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion 13$_1$; 13$_2$;13$_3$ [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the predetermined temporal segment 17* associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];

deriving dependency information 51, which indicates, for a substream 19$_1$;19$_2$;19$_3$[e.g., a predetermined substream, which, e.g., is a substream having a rank within the order which is higher than the lowest rank in the order] [or for each of the substreams] of the number of substreams, whether the substream is independent [e.g., independent from the other ones of the substreams, e.g., independently verifiable] or whether the substream depends on one or more reference substreams of the substream [e.g., the one or more reference substreams being out of the number of substreams];

checking the substream of the predetermined temporal segment on trustworthiness [e.g., checking each of the substreams on trustworthiness] by obtaining 21, based on an indication in the video data stream [e.g., using information derived from the video data stream, e.g., deriving the digital signature from the video data stream or deriving the digital signature from a source indicated in the video data stream], a digital signature 43$_1$;43;43$_3$ for the substream of the predetermined temporal segment 17*, using a hash function 31 [e.g., indicated in the data stream] to derive a hash value 33 based on the portion 13$_1$; 13$_2$;13$_3$of the predetermined temporal segment which is associated with the substream 19$_1$;19$_2$;19$_3$;

forming a verification string 48 [e.g., IdString] based on the hash value 33 and based on a reference hash value 35 [e.g., forming the verification string as a concatenation of at least, or exactly, the hash value and the reference hash value (e.g., the concatenation comprising, or consisting of, the hash value and the reference hash value)] by if the substream is independent [e.g., irrespective of whether the substream is the lowest substream in the order] [e.g., and if the predetermined temporal segment is not the first temporal segment of the sequence of temporal segments, and/or if, in a preceding temporal segment, which directly precedes the predetermined temporal segment in the sequence of temporal segments, the corresponding substream is verifiable (e.g., does not carry verification information which renders the corresponding substream of the preceding temporal segment checkable on trustworthiness, e.g., does not carry a digital signature)], using, as the reference hash value 35, a hash value derived for the corresponding substream 19$_1$' [e.g., corresponding to the substream (the one currently verified) in terms of its rank (e.g., the substream of identical rank within the order of substream as the substream to be currently verified); E.g., the temporal segment and the preceding temporal segment have the same number of substreams, the order among the substreams applying to both] of the preceding temporal segment 17', the preceding temporal segment [e.g., immediately] preceding the predetermined temporal segment in the sequence of temporal segments [e.g., the reference hash value is derived based on a portion associated with the corresponding substream of the preceding temporal segment]; and/or if the substream 19$_3$ depends on one or more reference substreams out of the number of substreams, the reference hash value is based on one or more of the following: [e.g., using one of the following as the reference hash value:]

if the predetermined temporal segment 17* is the first temporal segment of the sequence of temporal segments, and/or if a preceding temporal segment, which directly precedes the predetermined temporal segment in the sequence of temporal segments is unverifiable [e.g., does not carry verification information which renders the preceding temporal segment checkable on trustworthiness, e.g., does not carry a digital signature], a bitstring of bits of a predetermined value [e.g., one or zero], the bitstring having a predetermined length [e.g., which depends on the hash function], [e.g., and else one of the following]

a hash value derived for a predetermined substream 19'$_1$; 19'$_2$ of a preceding temporal segment 17', the preceding temporal segment [e.g., immediately] preceding the predetermined temporal segment in the sequence of temporal segments, wherein the predetermined substream corresponds to [e.g., in terms of its rank in the order] one of the following:

the lowest ranked [e.g., according to the hierarchical order] substream 19$_1$' within a set out of [the set of all out of] the one or more reference substreams [e.g., the one or more reference substreams corresponding, in terms of their ranks, to the one or more reference substreams of the substream (the one currently verified)] [e.g., which reference substreams are independent], the highest ranked [e.g., according to the hierarchical order] substream 19$_2$' within a set out of [the set of all out of] the one or more reference substreams [e.g., which reference substreams are independent], a combination [or union or concatenation] of hash values derived for a set of substreams of a preceding temporal segment, the preceding temporal segment [e.g., immediately] preceding the predetermined temporal segment in the sequence of temporal segments, wherein the set of substreams consisting of all reference substreams out of the one or more reference substreams, which are independent;

checking whether the verification string fits to the digital signature.

2. Apparatus according to embodiment 1, configured for, in checking whether the verification string fits to the digital signature, matches the check value, decrypting the digital signature to obtain a check value; and checking whether the verification string fits to [or matches] the check value.

3. Apparatus according to embodiment 1, configured for if the substream depends on one or more reference substreams out of the number of substreams, deriving the reference hash value based on one or more or all of respective hash values derived for the one or more reference substreams of the substream [of the predetermined temporal segment] [e.g. derived as defined for "the substream"].

4. Apparatus according to embodiment 3, configured for using, as the reference hash value, a hash value derived for the, according to the order, highest ranked substream out of the one or more reference substreams of the substream [of the predetermined temporal segment].
5. Apparatus according to embodiment 3, configured for using, as the reference hash value, a concatenation of two or more or all of the respective hash values derived for the one or more reference substreams of the substream [of the predetermined temporal segment] [e.g. derived as defined for "the substream"].
6. Apparatus according to embodiment 1, configured for if the substream depends on one or more reference substreams out of the number of substreams,
   forming the verification string further based on a further hash value [e.g., forming the verification string by concatenating at least, or exactly, the hash value, the further hash value, and the reference hash value (e.g., and optionally further information such as an identifier of the hash method and/or a content identifier of the substream)],
   wherein the apparatus is configured for deriving the further hash value based on one or more or all of respective hash values derived for the one or more reference substreams of the substream [of the predetermined temporal segment].
7. Apparatus according to embodiment 6, configured for using, as the further hash value, a hash value derived for the, according to the order, highest ranked substream out of the one or more reference substreams of the substream [of the predetermined temporal segment].
8. Apparatus According to Embodiment 6, Configured for using, as the further hash value, a concatenation of two or more or all of the respective hash values derived for the one or more reference substreams of the substream [of the predetermined temporal segment].
9. Apparatus according to any of the embodiments 1 to 8, configured for deriving the hash value 33 by subjecting the portion 13 of the predetermined temporal segment which is associated with the substream 19 to the hash function 31.
10. Apparatus according to embodiment 1 or any of the embodiments 3 to 5, configured for
   if the substream depends on one or more reference substreams out of the number of substreams, deriving the hash value by subjecting a combination [or a union or a concatenation] of
   the portion of the predetermined temporal segment which is associated with the substream, and
   the associated portions of the predetermined temporal segment of one or more or all of the one or more reference substreams of the substream
   to the hash function.
11. Apparatus according to any of the embodiments 1 to 10, configured for,
   if the substream is independent,
   if the predetermined temporal segment is the first temporal segment of the sequence of temporal segments, and/or if, in a preceding temporal segment, which directly precedes the predetermined temporal segment in the sequence of temporal segments, the corresponding substream is unverifiable [e.g., does not carry verification information which renders the corresponding substream of the preceding temporal segment checkable on trustworthiness, e.g., does not carry a digital signature],
   deriving the reference hash value 35 using [or using, as the reference hash value], a bitstring of bits of a predetermined value [e.g., one or zero], the bitstring having a predetermined length [e.g., which depends on the hash function].
12. Apparatus according to any of the embodiments 1 to 11, wherein the number of substreams comprises a plurality of independent substreams.
13. Apparatus according to any of the embodiments 1 to 12, configured for deriving the dependency information 51 from the video data stream 14.
14. Apparatus according to embodiment 13, configured for deriving, from the video data stream, an indication [e.g., a syntax element, e.g., a single one, e.g., a flag], which indicates a signaling mode according to which the dependency information is signaled in the video data stream, wherein the indication differentiates between a plurality of signaling modes including a first mode, according to which each substream having a rank within the order of substreams, that is higher than the lowest rank within the order, depends on all substreams, which are ranked lower within the order than the respective substream [e.g., and a second mode, according to which, for each of the substreams, dependency information is signaled individually, e.g., by indicating whether the respective substream is independent, and if not, one or more reference substreams of the respective substream].
15. Apparatus according to any of the embodiments 1 to 14, configured for deriving, from the video data stream, an indication, which indicates [e.g., for a further temporal segment of the sequence of segments] a mode of checking the temporal segment on trustworthiness.
16. Apparatus according to embodiment 15, wherein the indication differentiates between a plurality of modes comprising
   a first mode, according to which the checking of the trustworthiness is performed by, deriving [e.g., from an indication, e.g., a syntax element, in the video data stream] a number of substreams [e.g., verification substreams, e.g., substreams in portions of which the video data stream is verifiable] of the further temporal segment of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the further temporal segment associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];

deriving dependency information, which indicates, for a substream [e.g., a predetermined substream, which, e.g., is a substream having a rank within the order which is higher than the lowest rank in the order] [or for each of the substreams] of the number of substreams, whether the substream is independent [e.g., independent from the other ones of the substreams, e.g., independently verifiable] or whether the substream depends on one or more reference substreams of the substream [e.g., the one or more reference substreams being out of the number of substreams];

checking the substream of the further temporal segment on trustworthiness [e.g., checking each of the substreams on trustworthiness] by obtaining, based on an indication in the video data stream [e.g., using information derived from the video data stream, e.g., deriving the digital signature from the video data stream or deriving the digital signature from a source indicated in the video data stream], a digital signature for the substream of the further temporal segment, using a hash function [e.g., indicated in the data stream] to derive a hash value based on the portion of the further temporal segment which is associated with the substream;

forming a verification string [e.g., IdString] based on the hash value and based on a reference hash value by if the substream is independent [and, e.g., irrespective of whether the substream is the lowest substream in the order], using, as the reference hash value, a hash value derived for the corresponding substream [e.g., corresponding to the substream (the one currently verified) in terms of its rank (e.g., the substream of identical rank within the order of substream as the substream to be currently verified); E.g., the temporal sequence and the preceding temporal sequence have the same number of substreams, the order among the substreams applying to both] of the preceding temporal segment, the preceding temporal segment [e.g., immediately] preceding the further temporal segment in the sequence of temporal segments [e.g., the reference hash value is derived based on a portion associated with the corresponding substream of the preceding temporal segment];

decrypting the digital signature to obtain a check value; and checking whether the verification string matches the check value; and a second mode, according to which the checking on trustworthiness is performed by deriving [e.g., from an indication, e.g., a syntax element, in the video data stream] a number of substreams [e.g., verification substreams, e.g., substreams in portions of which the video data stream is verifiable] of the further temporal segment of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the further temporal segment associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];

checking the substream of the further temporal segment on trustworthiness [e.g., checking each of the substreams on trustworthiness] by obtaining, based on an indication in the video data stream [e.g., using information derived from the video data stream, e.g., deriving the digital signature from the video data stream or deriving the digital signature from a source indicated in the video data stream], a digital signature for the substream of the further temporal segment;

deriving a hash value by subjecting the portion of the further temporal segment which is associated with the substream to a hash function;

forming a verification string [e.g., IdString] based on the hash value and based on a reference hash value by using, as the reference hash value, a hash value derived for the, according to the order, next lower ranked substream of the number of substreams;

decrypting the digital signature to obtain a check value; and checking whether the verification string matches the check value.

17. Apparatus according to any of the embodiments 1 to 16, configured for, checking, for each of the substreams which is indicated to be independent [or indicated as not depending on any further one of the substreams], whether the portion of the predetermined temporal segment associated with the respective substream includes an independent layer of the predetermined temporal segment of the video data stream [e.g., the video data stream includes one or more layers, e.g., each of a plurality of sets of layers out of the one or more layers forming an independently decodable video data stream] [and if not, treating the video data stream as non-conform, e.g., rejecting the video data stream, or suppressing the verification].

18. Apparatus according to any of the embodiments 1 to 17, configured for checking, for each of the substreams, if the respective substream (s1) is indicated to depend on a reference substream (s0), whether the portion of the predetermined temporal segment associated with the respective substream (s1) includes a layer (L1) of the predetermined temporal segment of the video data stream [e.g., the video data stream includes one or more layers, e.g., each of a plurality of sets of layers out of the one or more layers forming an independently decodable video data stream], which layer (L1) depends on a reference layer (L0), which reference layer (L0) is associated with the reference substream (s0) [e.g. belongs to the portion of the predetermined temporal segment associated with the reference substream] [and if not, treating the video data stream as non-conform, e.g., rejecting the video data stream, or suppressing the verification].

19. Apparatus according to any of the embodiments 1 to 18, configured for, if the dependency information for the predetermined temporal segment indicates that more than one of the substreams are independent,
deriving, from the video data stream, a content identifier [e.g., a unique identifier associated with the content] [e.g., expecting that the video data stream includes, for each of the substreams indicated as being independent, a content identifier; or checking, whether the video data stream includes, for each of the substreams indicated as being independent, a content identifier, and if not treating the video data stream as non-conform, e.g., rejecting the video data stream, or suppressing the verification], and
if the predetermined temporal segment is independent, forming the verification string further based on the content identifier of the substream [e.g., including the content identifier in the verification string].

20. Apparatus according to any of the embodiments 1 to 19, wherein the apparatus is configured for decoding the video from the video data stream by block based predictive decoding and transform based residual decoding by decoding prediction residual data of an intra predicted block from the video data stream by use of context-adaptive binary arithmetic decoding by
decoding a coordinate of a position in a transform block representing the prediction residual data at which position a last non-zero transform coefficient is encountered when traversing transform coefficients of the transform block along a predetermined scan order, and
sequentially decoding values of transform coefficients including and ranked, along the predetermined scan order, between the last non-zero transform coefficient and a firstly scanned transform coefficient, and
selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

21. Apparatus 10 for encoding a video into a video data stream 14, wherein the apparatus is configured for rendering the video data stream checkable on trustworthiness [e.g., verifying the video data stream] in units of temporal segments 17;17*;17' [e.g., coded video sequences or coded layer video sequences] of a sequence of temporal segments of the video data stream [e.g., the video data stream being subdivided into the temporal segments, each comprising a plurality of access units (or time frames) of the video data stream], wherein the apparatus is configured for
obtaining [e.g., and inserting into an indication, e.g., a syntax element, in the video data stream] [e.g., rendering the temporal segments checkable on trustworthiness in units of substreams] a number of substreams $\mathbf{19}_1$;$\mathbf{19}_2$;$\mathbf{19}_3$ [e.g., verification substreams, e.g., substreams in portions of which the video data stream is verifiable] of a predetermined temporal segment 17* of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion $\mathbf{13}_1$; $\mathbf{13}_2$;$\mathbf{13}_3$ [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the predetermined temporal segment 17* associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];
obtaining [e.g., and inserting into an indication, e.g., a syntax element, in the video data stream] dependency information 51, which indicates, for a substream [e.g., a predetermined substream, which, e.g., is a substream having a rank within the order which is higher than the lowest rank in the order] [or for each of the substreams] of the number of substreams $\mathbf{19}_1$;$\mathbf{19}_2$;$\mathbf{19}_3$, whether the substream is independent [e.g., independent from the other ones of the substreams, e.g., independently verifiable] or whether the substream depends on one or more reference substreams of the substream [e.g., the one or more reference substreams being out of the number of substreams];
rendering the substream of the predetermined temporal segment checkable on trustworthiness [e.g., checking each of the substreams on trustworthiness] by
using a hash function 31 [e.g., indicated in the data stream] to derive a hash value 33 based on the portion $\mathbf{13}_1$; $\mathbf{13}_2$;$\mathbf{13}_3$ of the predetermined temporal segment 17* which is associated with the substream $\mathbf{19}_1$;$\mathbf{19}_2$;$\mathbf{19}_3$;
forming a verification string 48 [e.g., IdString] based on the hash value 33 and based on a reference hash value 35 [e.g., forming the verification string as a concatenation of at least, or exactly, the hash value and the reference hash value (e.g., the concatenation comprising, or consisting of, the hash value and the reference hash value)] by
if the substream is independent [e.g., irrespective of whether the substream is the lowest substream in the order] [e.g., and if the predetermined temporal segment is the first temporal segment of the sequence of temporal segments, and/or if, in a preceding temporal segment, which directly precedes the predetermined temporal segment in the sequence of temporal segments, the corresponding substream is unverifiable (e.g., does not carry verification information which renders the corresponding substream of the preceding temporal segment checkable on trustworthiness, e.g., does not carry a digital signature)], using, as the reference hash value, a hash value derived for the corresponding substream [e.g., corresponding to the substream (the one currently verified) in terms of its rank (e.g., the substream of identical rank within the order of substream as the substream to be currently verified); E.g., the temporal sequence and the preceding temporal sequence have the same number of substreams, the order among the substreams applying to both] of the preceding temporal segment 17', the preceding temporal segment [e.g., immediately] preceding the predetermined temporal segment in the sequence of temporal segments [e.g., the reference hash value is derived based on a portion associated with the corresponding substream of the preceding temporal segment]; and/or if the substream $\mathbf{19}_3$ depends on one or more reference substreams out of the number of substreams, the reference hash value is based on one or more of the following [e.g., using one of the following as the reference hash value:]

if the predetermined temporal segment 17* is the first temporal segment of the sequence of temporal segments, and/or if a preceding temporal segment, which directly precedes the predetermined temporal segment in the sequence of temporal segments is unverifiable [e.g., does not carry verification information which renders the preceding temporal segment checkable on trustworthiness, e.g., does not carry a digital signature], a bitstring of bits of a predetermined value [e.g., one or zero], the bitstring having a predetermined length [e.g., which depends on the hash function], [e.g., and else one of the following]

a hash value derived for a predetermined substream of a preceding temporal segment, the preceding temporal segment [e.g., immediately] preceding the predetermined temporal segment in the sequence of temporal segments, wherein the predetermined substream corresponds to one of the following:

the lowest ranked [e.g., according to the hierarchical order] substream $\mathbf{19}_1$' within a set out of [the set of all out of] the one or more reference substreams [e.g., the one or more reference substreams corresponding, in terms of their ranks, to the one or more reference substreams of the substream (the one currently verified)] [e.g., which reference substreams are independent], the highest ranked [e.g., according to the hierarchical order] substream $\mathbf{19}_2$' within a set out of [the set of all out of] the one or more reference substreams [e.g., which reference substreams are independent], a combination [or union or concatenation] of hash values derived for a set of substreams of a preceding temporal segment, the preceding temporal segment [e.g., immediately] preceding the predetermined temporal segment in the sequence of temporal segments, wherein the set of substreams consisting of all reference substreams out of the one or more reference substreams, which are independent;

obtaining a digital signature based on the verification string [e.g., obtaining the digital signature by signing (e.g., digitally signing, e.g., using a private key of an asymmetric encryption scheme) the verification string], and inserting an indication of the digital signature in the video data stream.

22. Apparatus according to embodiment 21, configured for if the substream depends on one or more reference substreams out of the number of substreams, deriving the reference hash value based on one or more or all of respective hash values derived for the one or more reference substreams of the substream [of the predetermined temporal sequence] [e.g. derived as defined for "the substream"].

23. Apparatus according to embodiment 22, configured for using, as the reference hash value, a hash value derived for the, according to the order, highest ranked substream out of the one or more reference substreams of the substream [of the predetermined temporal sequence].

24. Apparatus according to embodiment 22, configured for using, as the reference hash value, a concatenation of two or more or all of the respective hash values derived for the one or more reference substreams of the substream [of the predetermined temporal sequence] [e.g. derived as defined for "the substream"].

25. Apparatus according to embodiment 21, configured for if the substream depends on one or more reference substreams out of the number of substreams, forming the verification string further based on a further hash value [e.g., forming the verification string by concatenating at least, or exactly, the hash value, the further hash value, and the reference hash value (e.g., and optionally further information such as an identifier of the hash method and/or a content identifier of the substream)], wherein the apparatus is configured for deriving the further hash value based on one or more or all of respective hash values derived for the one or more reference substreams of the substream [of the predetermined temporal sequence].

26. Apparatus according to embodiment 25, configured for using, as the further hash value, a hash value derived for the, according to the order, highest ranked substream out of the one or more reference substreams of the substream [of the predetermined temporal sequence].

27. Apparatus according to embodiment 25, configured for using, as the further hash value, a concatenation of two or more or all of the respective hash values derived for the one or more reference substreams of the substream [of the predetermined temporal sequence].

28. Apparatus according to any of the embodiments 21 to 27, configured for deriving the hash value by subjecting the portion of the predetermined temporal segment which is associated with the substream to the hash function.

29. Apparatus according to embodiment 22 or any of the embodiments 22 to 24, configured for if the substream depends on one or more reference substreams out of the number of substreams, deriving the hash value by subjecting a combination [or a union or a concatenation] of the portion of the predetermined temporal segment which is associated with the substream, and the associated portions of the predetermined temporal segment of one or more or all of the one or more reference substreams of the substream to the hash function.

30. Apparatus according to any of the embodiments 21 to 29, configured for, if the substream is independent, if the predetermined temporal segment is the first temporal segment of the sequence of temporal segments, and/or if, in a preceding temporal segment, which directly precedes the predetermined temporal segment in the sequence of temporal segments, the corresponding substream is unverifiable [e.g., does not carry verification information which renders the corresponding substream of the preceding temporal segment checkable on trustworthiness, e.g., does not carry a digital signature], deriving the reference hash value using [or using, as the reference hash value], a bitstring of bits of a predetermined value [e.g., one or zero], the bitstring having a predetermined length [e.g., which depends on the hash function].

31. Apparatus according to any of the embodiments 21 to 30, wherein the number of substreams comprises a plurality of independent substreams.

32. Apparatus according to any of the embodiments 21 to 31, configured for inserting the dependency information into the video data stream.

33. Apparatus according to embodiment 32, configured for inserting, into the video data stream, an indication [e.g., a syntax element, e.g., a single one, e.g., a flag], which indicates a signaling mode according to which the dependency information is signaled in the video data stream, wherein the indication differentiates between a plurality of signaling modes including a first mode, according to which each substream having a rank within the order of substreams, that is higher than the lowest rank within the order, depends on all substreams, which are ranked lower within the order than the respective substream [e.g., and a second mode, according to which, for each of the substreams, dependency information is signaled individually, e.g., by indicating whether the respective substream is independent, and if not, one or more reference substreams of the respective substream].

34. Apparatus according to any of the embodiments 21 to 33, configured for inserting, into the video data stream, an indication, which indicates [e.g., for a further temporal segment of the sequence of segments] a mode of checking the temporal segment on trustworthiness.

35. Apparatus according to embodiment 34, wherein the indication differentiates between a plurality of modes comprising a first mode, according to which the rendering checkable on trustworthiness is performed by, obtaining [e.g., and inserting into an indication, e.g., a syntax element, in the video data stream] [e.g., rendering the temporal segments checkable on trustworthiness in units of substreams] a number of substreams [e.g., verification substreams, e.g., substreams in portions of which the video data stream is verifiable] of a predetermined temporal segment of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the predetermined temporal segment associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];

obtaining [e.g., and inserting into an indication, e.g., a syntax element, in the video data stream] dependency information, which indicates, for a substream [e.g., a predetermined substream, which, e.g., is a substream having a rank within the order which is higher than the lowest rank in the order] [or for each of the substreams] of the number of substreams, whether the substream is independent [e.g., independent from the other ones of the substreams, e.g., independently verifiable] or whether the substream depends on one or more reference substreams of the substream [e.g., the one or more reference substreams being out of the number of substreams];

rendering the substream of the predetermined temporal segment checkable on trustworthiness [e.g., checking each of the substreams on trustworthiness] by using a hash function [e.g., indicated in the data stream] to derive a hash value based on the portion of the predetermined temporal segment which is associated with the substream;

forming a verification string [e.g., IdString] based on the hash value and based on a reference hash value [e.g., forming the verification string as a concatenation of at least, or exactly, the hash value and the reference hash value (e.g., the concatenation comprising, or consisting of, the hash value and the reference hash value)] by if the substream is independent [e.g., irrespective of whether the substream is the lowest substream in the order] [e.g., and if the predetermined temporal segment is the first temporal segment of the sequence of temporal segments, and/or if, in a preceding temporal segment, which directly precedes the predetermined temporal segment in the sequence of temporal segments, the corresponding substream is unverifiable (e.g., does not carry verification information which renders the corresponding substream of the preceding temporal segment checkable on trustworthiness, e.g., does not carry a digital signature)], using, as the reference hash value, a hash value derived for the corresponding substream [e.g., corresponding to the substream (the one currently verified) in terms of its rank (e.g., the substream of identical rank within the order of substream as the substream to be currently verified); E.g., the temporal sequence and the preceding temporal sequence have the same number of substreams, the order among the substreams applying to both] of the preceding temporal segment, the preceding temporal segment [e.g., immediately] preceding the predetermined temporal segment in the sequence of temporal segments [e.g., the reference hash value is derived based on a portion associated with the corresponding substream of the preceding temporal segment]; and/or if the substream depends on one or more reference substreams out of the number of substreams, the reference hash value is based on one or more of the following [e.g., using one of the following as the reference hash value:]

if the predetermined temporal segment is the first temporal segment of the sequence of temporal segments, and/or if a preceding temporal segment, which directly precedes the predetermined temporal segment in the sequence of temporal segments is unverifiable [e.g., does not carry verification information which renders the preceding temporal segment checkable on trustworthiness, e.g., does not carry a digital signature], a bitstring of bits of a predetermined value [e.g., one or zero], the bitstring having a predetermined length [e.g., which depends on the hash function], [e.g., and else one of the following]

a hash value derived for a predetermined substream of a preceding temporal segment, the preceding temporal segment [e.g., immediately] preceding the predetermined temporal segment in the sequence of temporal segments, wherein the predetermined substream is one of the following:

the lowest ranked [e.g., according to the hierarchical order] substream within a set out of [the set of all out of] the one or more reference substreams [e.g., the one or more reference substreams corresponding, in terms of their ranks, to the one or more reference substreams of the substream (the one currently verified)], which reference substreams are independent, the highest ranked [e.g., according to the hierarchical order] substream within a set out of [the set of all out of] the one or more reference substreams, which reference substreams are independent, a combination [or union or concatenation] of hash values derived for a set of substreams of a preceding temporal segment, the preceding temporal segment [e.g., immediately] preceding the predetermined temporal segment in the sequence of temporal segments, wherein the set of substreams consisting of all reference substreams out of the one or more reference substreams, which are independent;

obtaining a digital signature based on the verification string [e.g., obtaining the digital signature by signing (e.g., digitally signing, e.g., using a private key of an asymmetric encryption scheme) the verification string], and inserting an indication of the digital signature in the video data stream; and a second mode, according to which the checking on trustworthiness is performed by obtaining [e.g., from an indication, e.g., a syntax element, in the video data stream] a number of substreams [e.g., verification substreams, e.g., substreams in portions of which the video data stream is verifiable] of the further temporal segment of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the further temporal segment associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];

rendering the substream of the further temporal segment checkable on trustworthiness [e.g., checking each of the substreams on trustworthiness] by deriving a hash value by subjecting the portion of the further temporal segment which is associated with the substream to a hash function;

forming a verification string [e.g., IdString] based on the hash value and based on a reference hash value by using, as the reference hash value, a hash value derived for the, according to the order, next lower ranked substream of the number of substreams;

obtaining a digital signature based on the verification string [e.g., obtaining the digital signature by signing (e.g., digitally signing, e.g., using a private key of an asymmetric encryption scheme) the verification string], and inserting an indication of the digital signature in the video data stream.

36. Apparatus according to any of the embodiments 21 to 35, configured for obtaining the dependency information in a manner that, for each of the substreams, if the respective substream is indicated to be independent [or indicated as not depending on any further one of the substreams], the portion of the predetermined temporal segment associated with the respective substream includes an independent layer of the predetermined temporal segment of the video data stream [e.g., the video data stream includes one or more layers, e.g., each of a plurality of sets of layers out of the one or more layers forming an independently decodable video data stream].

37. Apparatus according to any of the embodiments 21 to 36, configured for obtaining the dependency information in a manner that, for each of the substreams, if the respective substream (s1) is indicated to depend on a reference substream (s0), the portion of the predetermined temporal segment associated with the respective substream (s1) includes a layer (L1) of the predetermined temporal segment of the video data stream [e.g., the video data stream includes one or more layers, e.g., each of a plurality of sets of layers out of the one or more layers forming an independently decodable video data stream], which layer (L1) depends on a reference layer (L0), which reference layer (L0) is associated with the reference substream (s0) [e.g. belongs to the portion of the predetermined temporal segment associated with the reference substream].

38. Apparatus according to any of the embodiments 21 to 37, configured for, if the dependency information for the predetermined temporal segment indicates that more than one of the substreams are independent,
   inserting, into the video data stream, a content identifier [e.g., a unique identifier associated with the content], and
   if the substream is independent, forming the verification string further based on the content identifier of the substream [e.g., including the content identifier in the verification string].

39. Apparatus according to any of the embodiments 21 to 38, wherein the apparatus is configured for encoding the video into the video data stream by block-based predictive coding and transform-based residual coding by encoding prediction residual data of an intra predicted block into the video data stream by use of context-adaptive binary arithmetic coding by
   encoding a coordinate of a position in a transform block representing the prediction residual data at which a last non-zero transform coefficient is encountered when traversing transform coefficients of the transform block along a predetermined scan order, and
   sequentially encoding values of transform coefficients including and ranked, along the predetermined scan order, between the last non-zero transform coefficient and a firstly scanned transform coefficient, and
   selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

40. Method for decoding a video from a video data stream 14, wherein the method comprises checking the video data stream on trustworthiness [e.g., verifying the video data stream] in units of temporal segments 17;17*;17' [e.g., coded video sequences or coded layer video sequences] of a sequence of temporal segments of the video data stream, wherein the method comprises:
   deriving [e.g., from an indication, e.g., a syntax element, in the video data stream] [e.g., checking the temporal segments on trustworthiness in units of substreams] a number of substreams $\mathbf{19_1}$;$\mathbf{19_2}$;$\mathbf{19_3}$ [e.g., verification substreams, e.g., substreams in portions of which the video data stream is verifiable] of a predetermined temporal segment 17* of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion $\mathbf{13_1}$; $\mathbf{13_2}$;$\mathbf{13_3}$ [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the predetermined temporal segment 17* associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];
   deriving dependency information 51, which indicates, for a substream $\mathbf{19_1}$;$\mathbf{19_2}$;$\mathbf{19_3}$ [e.g., a predetermined substream, which, e.g., is a substream having a rank within the order which is higher than the lowest rank in the order] [or for each of the substreams] of the number of substreams, whether the substream is independent [e.g., independent from the other ones of the substreams, e.g., independently verifiable] or whether the substream depends on one or more reference substreams of the substream [e.g., the one or more reference substreams being out of the number of substreams];
   checking the substream of the predetermined temporal segment on trustworthiness [e.g., checking each of the substreams on trustworthiness] by
      obtaining 21, based on an indication in the video data stream [e.g., using information derived from the video data stream, e.g., deriving the digital signature from the video data stream or deriving the digital signature from a source indicated in the video data stream], a digital signature $\mathbf{43_1}$;43;$\mathbf{43_3}$ for the substream of the predetermined temporal segment 17*,
      using a hash function 31 [e.g., indicated in the data stream] to derive a hash value 33 based on the portion $\mathbf{13_1}$; $\mathbf{13_2}$;$\mathbf{13_3}$of the predetermined temporal segment which is associated with the substream $\mathbf{19_1}$;$\mathbf{19_2}$;$\mathbf{19_3}$;
      forming a verification string 48 [e.g., IdString] based on the hash value 33 and based on a reference hash value 35 [e.g., forming the verification string as a concatenation of at least, or exactly, the hash value and the reference hash value (e.g., the concatenation comprising, or consisting of, the hash value and the reference hash value)] by
         if the substream is independent [e.g., irrespective of whether the substream is the lowest substream in the order] [e.g., and if the predetermined temporal segment is not the first temporal segment of the sequence of temporal segments, and/or if, in a preceding temporal segment, which directly precedes the predetermined temporal segment in the sequence of temporal segments, the corresponding substream is verifiable (e.g., does not carry verification information which renders the corresponding substream of the preceding temporal segment checkable on trustworthiness, e.g., does not carry a digital signature)], using, as the reference hash value 35, a hash value derived for the corresponding substream $\mathbf{19_1}$' [e.g., corresponding to the substream (the one currently verified) in terms of its rank (e.g., the substream of identical rank within the order of substream as the substream to be currently verified); E.g., the temporal segment and the preceding temporal segment have the same number of substreams, the order among the substreams applying to both] of the preceding temporal segment 17', the preceding temporal segment [e.g., immediately] preceding the predetermined temporal segment in the sequence of temporal segments [e.g., the reference hash value is derived based on a portion associated with the corresponding substream of the preceding temporal segment]; and/or if the substream $19_3$ depends on one or more reference substreams out of the number of substreams, the reference hash value is based on one or more of the following: [e.g., using one of the following as the reference hash value:]

if the predetermined temporal segment 17* is the first temporal segment of the sequence of temporal segments, and/or if a preceding temporal segment, which directly precedes the predetermined temporal segment in the sequence of temporal segments is unverifiable [e.g., does not carry verification information which renders the preceding temporal segment checkable on trustworthiness, e.g., does not carry a digital signature], a bitstring of bits of a predetermined value [e.g., one or zero], the bitstring having a predetermined length [e.g., which depends on the hash function], [e.g., and else one of the following]

a hash value derived for a predetermined substream $19'_1$; $19'_2$ of a preceding temporal segment 17', the preceding temporal segment [e.g., immediately] preceding the predetermined temporal segment in the sequence of temporal segments, wherein the predetermined substream corresponds to [e.g., in terms of its rank in the order] one of the following:

the lowest ranked [e.g., according to the hierarchical order] substream $19_1'$ within a set out of [the set of all out of] the one or more reference substreams [e.g., the one or more reference substreams corresponding, in terms of their ranks, to the one or more reference substreams of the substream (the one currently verified)] [e.g., which reference substreams are independent], the highest ranked [e.g., according to the hierarchical order] substream $19_2'$ within a set out of [the set of all out of] the one or more reference substreams [e.g., which reference substreams are independent], a combination [or union or concatenation] of hash values derived for a set of substreams of a preceding temporal segment, the preceding temporal segment [e.g., immediately] preceding the predetermined temporal segment in the sequence of temporal segments, wherein the set of substreams consisting of all reference substreams out of the one or more reference substreams, which are independent;

checking whether the verification string fits to the digital signature.

41. Method for encoding a video into a video data stream 14, wherein the method comprises rendering the video data stream checkable on trustworthiness [e.g., verifying the video data stream] in units of temporal segments 17;17*;17' [e.g., coded video sequences or coded layer video sequences] of a sequence of temporal segments of the video data stream, wherein the method comprises:

obtaining [e.g., and inserting into an indication, e.g., a syntax element, in the video data stream] [e.g., rendering the temporal segments checkable on trustworthiness in units of substreams] a number of substreams $19_1$;$19_2$;$19_3$ [e.g., verification substreams, e.g., substreams in portions of which the video data stream is verifiable] of a predetermined temporal segment 17* of the temporal segments [or portions of the video data stream, e.g., a substream representing a temporal substream (e.g., being characterized by a temporal resolution, e.g., including every second frame) or a selection of a data type (e.g., 3D views) or a subset of layers of the video data stream] [e.g., by deriving a count of substreams from the video data stream], each of the substreams having a portion $13_1$; $13_2$;$13_3$ [e.g., a set of payload packets, e.g., NAL units, e.g. coded video payload packets, e.g., CVL NAL units and, optionally, a set of, e.g., a subset of all, associated (with the coded video payload packets) supplemental information payload packets, e.g., SEI NAL units] of the predetermined temporal segment 17* associated therewith [e.g., the apparatus is configured for deriving, from the video data stream, for a substream to be verified or for each of the substreams, the portion which is associated with the respective substream], the number of substreams having an order [e.g., a hierarchical order] defined among them [e.g., the apparatus is configured for sequentially checking one or more or all of the number of substreams from lower to higher order];

obtaining [e.g., and inserting into an indication, e.g., a syntax element, in the video data stream] dependency information 51, which indicates, for a substream [e.g., a predetermined substream, which, e.g., is a substream having a rank within the order which is higher than the lowest rank in the order] [or for each of the substreams] of the number of substreams $19_1$;$19_2$;$19_3$, whether the substream is independent [e.g., independent from the other ones of the substreams, e.g., independently verifiable] or whether the substream depends on one or more reference substreams of the substream [e.g., the one or more reference substreams being out of the number of substreams];

rendering the substream of the predetermined temporal segment checkable on trustworthiness [e.g., checking each of the substreams on trustworthiness] by using a hash function 31 [e.g., indicated in the data stream] to derive a hash value 33 based on the portion $13_1$; $13_2$;$13_3$ of the predetermined temporal segment 17* which is associated with the substream $19_1$;$19_2$;$19_3$;

forming a verification string 48 [e.g., IdString] based on the hash value 33 and based on a reference hash value 35 [e.g., forming the verification string as a concatenation of at least, or exactly, the hash value and the reference hash value (e.g., the concatenation comprising, or consisting of, the hash value and the reference hash value)] by if the substream is independent [e.g., irrespective of whether the substream is the lowest substream in the order] [e.g., and if the predetermined temporal segment is the first temporal segment of the sequence of temporal segments, and/or if, in a preceding temporal segment, which directly precedes the predetermined temporal segment in the sequence of temporal segments, the corresponding substream is unverifiable (e.g., does not carry verification information which renders the corresponding substream of the preceding temporal segment checkable on trustworthiness, e.g., does not carry a digital signature)], using, as the reference hash value, a hash value derived for the corresponding substream [e.g., corresponding to the substream (the one currently verified) in terms of its rank (e.g., the substream of identical rank within the order of substream as the substream to be currently verified); E.g., the temporal sequence and the preceding temporal sequence have the same number of substreams, the order among the substreams applying to both] of the preceding temporal segment 17', the preceding temporal segment [e.g., immediately] preceding the predetermined temporal segment in the sequence of temporal segments [e.g., the reference hash value is derived based on a portion associated with the corresponding substream of the preceding temporal segment]; and/or if the substream $\mathbf{19}_3$ depends on one or more reference substreams out of the number of substreams, the reference hash value is based on one or more of the following [e.g., using one of the following as the reference hash value:]

if the predetermined temporal segment 17* is the first temporal segment of the sequence of temporal segments, and/or if a preceding temporal segment, which directly precedes the predetermined temporal segment in the sequence of temporal segments is unverifiable [e.g., does not carry verification information which renders the preceding temporal segment checkable on trustworthiness, e.g., does not carry a digital signature], a bitstring of bits of a predetermined value [e.g., one or zero], the bitstring having a predetermined length [e.g., which depends on the hash function], [e.g., and else one of the following]

a hash value derived for a predetermined substream of a preceding temporal segment, the preceding temporal segment [e.g., immediately] preceding the predetermined temporal segment in the sequence of temporal segments, wherein the predetermined substream corresponds to one of the following:

the lowest ranked [e.g., according to the hierarchical order] substream $\mathbf{19}_1$' within a set out of [the set of all out of] the one or more reference substreams [e.g., the one or more reference substreams corresponding, in terms of their ranks, to the one or more reference substreams of the substream (the one currently verified)] [e.g., which reference substreams are independent], the highest ranked [e.g., according to the hierarchical order] substream $\mathbf{19}_2$' within a set out of [the set of all out of] the one or more reference substreams [e.g., which reference substreams are independent], a combination [or union or concatenation] of hash values derived for a set of substreams of a preceding temporal segment, the preceding temporal segment [e.g., immediately] preceding the predetermined temporal segment in the sequence of temporal segments, wherein the set of substreams consisting of all reference substreams out of the one or more reference substreams, which are independent;

obtaining a digital signature based on the verification string [e.g., obtaining the digital signature by signing (e.g., digitally signing, e.g., using a private key of an asymmetric encryption scheme) the verification string], and inserting an indication of the digital signature in the video data stream.

42. Video data stream [e.g., Non-transitory digital storage medium having stored thereon a data stream] comprising a video, wherein the video is encoded into the video data stream using the method of embodiment 43.
43. A computer program for implementing the method of any of embodiments 43 or 44 when being executed on a computer or signal processor.

Implementation Alternatives

Although some aspects have been described as features in the context of an apparatus it is clear that such a description may also be regarded as a description of corresponding features of a method. Although some aspects have been described as features in the context of a method, it is clear that such a description may also be regarded as a description of corresponding features concerning the functionality of an apparatus. In particular, block diagrams illustrating the functionality of an apparatus may also be understood as illustration of a respective method comprising the functions described by the blocks of the block diagram as steps of the method.

The data signal or data stream provided by embodiments of the invention can be stored on a digital storage medium, e.g., a non-transitory or transitory digital storage medium, or can be transmitted on a transmission medium such as a wireless transmission medium or a wired transmission medium. In other words, further embodiments provide a computer product, e.g., a data stream product or bitstream product, e.g., a non-transitory digital storage medium, the computer product including, e.g., having stored thereon, the data signal or data stream according to any of the herein described embodiments.

Further embodiments provide a method for storing data, the method comprising a step of storing a data stream on a digital storage medium, e.g., a non-transitory digital storage medium, the data stream carrying the data. For example, the data stream is in accordance with any of the embodiments described herein. For example, has the data encoded thereinto according to any of the encoding methods described herein.

Further embodiments provide a method for transmitting a data stream of any of the embodiments described herein.

Features described with respect to an apparatus for receiving or processing a signal (e.g., receiver, decoder) are to be understood to serve as a description of a respective feature for an apparatus for providing the signal (e.g., an encoder) and vice versa, and as a feature of a respective signal, e.g., a data stream. In particular, the skilled person will understand that any information, e.g., a data type, structure, item, which is to be received by the receiver, or derived from the signal by the receiver, is inserted into the signal by a corresponding provider, and vice versa.

Some or all of the method steps may be executed by (or using) a hardware apparatus, like for example, a microprocessor, a programmable computer or an electronic circuit. In some embodiments, one or more of the most important method steps may be executed by such an apparatus.

The inventive encoded image signal can be stored on a digital storage medium or can be transmitted on a transmission medium such as a wireless transmission medium or a wired transmission medium such as the Internet. In other words, further embodiments provide a video bitstream product including the video bitstream according to any of the herein described embodiments, e.g. a digital storage medium having stored thereon the video bitstream.

Depending on certain implementation requirements, embodiments of the invention can be implemented in hardware or in software or at least partially in hardware or at least partially in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitory.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The apparatus described herein may be implemented using a hardware apparatus, or using a computer, or using a combination of a hardware apparatus and a computer.

The methods described herein may be performed using a hardware apparatus, or using a computer, or using a combination of a hardware apparatus and a computer.

In the foregoing Detailed Description, it can be seen that various features are grouped together in examples for the purpose of streamlining the disclosure. This method of disclosure is not to be interpreted as reflecting an intention that the claimed examples require more features than are expressly recited in each claim. Rather, as the following claims reflect, subject matter may lie in less than all features of a single disclosed example. Thus the following claims are hereby incorporated into the Detailed Description, where each claim may stand on its own as a separate example. While each claim may stand on its own as a separate example, it is to be noted that, although a dependent claim may refer in the claims to a specific combination with one or more other claims, other examples may also include a combination of the dependent claim with the subject matter of each other dependent claim or a combination of each feature with other dependent or independent claims. Such combinations are proposed herein unless it is stated that a specific combination is not intended. Furthermore, it is intended to include also features of a claim to any other independent claim even if this claim is not directly made dependent to the independent claim.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. An apparatus for decoding a video from a video data stream, wherein the apparatus is configured for checking the video data stream on trustworthiness in units of temporal segments of a sequence of temporal segments of the video data stream, wherein the apparatus comprises one or more processors configured for deriving a number of substreams of a predetermined temporal segment of the temporal segments, each of the substreams having a portion of the predetermined temporal segment associated therewith, the number of substreams having an order defined among them;

deriving dependency information, which indicates, for a substream of the number of substreams, whether the substream is independent or whether the substream depends on one or more reference substreams of the substream;

checking the substream of the predetermined temporal segment on trustworthiness by acquiring, based on an indication in the video data stream, a digital signature for the substream of the predetermined temporal segment, using a hash function to derive a hash value based on the portion of the predetermined temporal segment which is associated with the substream;

forming a verification string based on the hash value and based on a reference hash value by if the substream is independent, using, as the reference hash value, a hash value derived for the corresponding substream of the preceding temporal segment, the preceding temporal segment preceding the predetermined temporal segment in the sequence of temporal segments; and/or if the substream depends on one or more reference substreams out of the number of substreams, the reference hash value is based on one or more of the following:

if the predetermined temporal segment is the first temporal segment of the sequence of temporal segments, and/or if a preceding temporal segment, which directly precedes the predetermined temporal segment in the sequence of temporal segments is unverifiable, a bitstring of bits of a predetermined value, the bitstring comprising a predetermined length, a hash value derived for a predetermined substream; of a preceding temporal segment, the preceding temporal segment preceding the predetermined temporal segment in the sequence of temporal segments, wherein the predetermined substream corresponds to the lowest ranked substream within a set out of the one or more reference substreams, a combination of hash values derived for a set of substreams of a preceding temporal segment, the preceding temporal segment preceding the predetermined temporal segment in the sequence of temporal segments, the set of substreams consisting of all reference substreams out of the one or more reference substreams, which are independent;

checking whether the verification string fits to the digital signature.

2. The apparatus according to claim 1, configured for, in checking whether the verification string fits to the digital signature, matches the check value, decrypting the digital signature to acquire a check value; and checking whether the verification string fits to the check value.

3. The apparatus according to claim 1, configured for if the substream depends on one or more reference substreams out of the number of substreams, deriving the reference hash value based on one or more or all of respective hash values derived for the one or more reference substreams of the substream.

4. The apparatus according to claim 3, configured for using, as the reference hash value, a hash value derived for the, according to the order, highest ranked substream out of the one or more reference substreams of the substream, or using, as the reference hash value, a concatenation of two or more or all of the respective hash values derived for the one or more reference substreams of the substream.

5. The apparatus according to claim 1, configured for if the substream depends on one or more reference substreams out of the number of substreams, forming the verification string further based on a further hash value, wherein the apparatus is configured for deriving the further hash value based on one or more or all of respective hash values derived for the one or more reference substreams of the substream.

6. The apparatus according to claim 5, configured for using, as the further hash value, a hash value derived for the, according to the order, highest ranked substream out of the one or more reference substreams of the substream, or using, as the further hash value, a concatenation of two or more or all of the respective hash values derived for the one or more reference substreams of the substream.

7. The apparatus according to claim 1, configured for deriving the hash value by subjecting the portion of the predetermined temporal segment which is associated with the substream to the hash function.

8. The apparatus according to claim 1, configured for if the substream depends on one or more reference substreams out of the number of substreams, deriving the hash value by subjecting a combination of the portion of the predetermined temporal segment which is associated with the substream, and the associated portions of the predetermined temporal segment of one or more or all of the one or more reference substreams of the substream to the hash function.

9. The apparatus according to claim 1, configured for, if the substream is independent, if the predetermined temporal segment is the first temporal segment of the sequence of temporal segments, and/or if, in a preceding temporal segment, which directly precedes the predetermined temporal segment in the sequence of temporal segments, the corresponding substream is unverifiable, deriving the reference hash value using, the bitstring of bits of the predetermined value, the bitstring comprising the predetermined length.

10. The apparatus according to claim 1, wherein the number of substreams comprises a plurality of independent substreams.

11. The apparatus according to claim 1, configured for deriving the dependency information from the video data stream.

12. The apparatus according to claim 11, configured for deriving, from the video data stream, an indication, which indicates a signaling mode according to which the dependency information is signaled in the video data stream, wherein the indication differentiates between a plurality of signaling modes comprising a first mode, according to which each substream comprising a rank within the order of substreams, that is higher than the lowest rank within the order, depends on all substreams, which are ranked lower within the order than the respective substream.

13. The apparatus according to claim 1, configured for, checking, for each of the substreams which is indicated to be independent, whether the portion of the predetermined temporal segment associated with the respective substream comprises an independent layer of the predetermined temporal segment of the video data stream.

14. The apparatus according to claim 1, configured for checking, for each of the substreams, if the respective substream is indicated to depend on a reference substream, whether the portion of the predetermined temporal segment associated with the respective substream comprises a layer of the predetermined temporal segment of the video data stream, which layer depends on a reference layer, which reference layer is associated with the reference substream.

15. The apparatus according to claim 1, wherein the apparatus is configured for decoding the video from the video data stream by block based predictive decoding and transform based residual decoding by decoding prediction residual data of an intra predicted block from the video data stream by use of context-adaptive binary arithmetic decoding by decoding a coordinate of a position in a transform block representing the prediction residual data at which position a last non-zero transform coefficient is encountered when traversing transform coefficients of the transform block along a predetermined scan order, and sequentially decoding values of transform coefficients including and ranked, along the predetermined scan order, between the last non-zero transform coefficient and a firstly scanned transform coefficient, and selecting the predetermined scan order among a diagonal scan order, a horizontal scan order, and a vertical scan order depending on an intra prediction mode of the intra predicted block by use of a mapping which maps each of a plurality of intra prediction modes onto a corresponding one of the diagonal scan order, the horizontal scan order, and the vertical scan order.

16. An apparatus for encoding a video into a video data stream, wherein the apparatus is configured for rendering the video data stream checkable on trustworthiness in units of temporal segments of a sequence of temporal segments of the video data stream, wherein the apparatus comprises one or more processors configured for acquiring a number of substreams of a predetermined temporal segment of the temporal segments, each of the substreams having a portion of the predetermined temporal segment associated therewith, the number of substreams having an order defined among them;

acquiring dependency information, which indicates, for a substream of the number of substreams, whether the substream is independent or whether the substream depends on one or more reference substreams of the substream;

rendering the substream of the predetermined temporal segment checkable on trustworthiness by using a hash function to derive a hash value based on the portion of the predetermined temporal segment which is associated with the substream;

forming a verification string based on the hash value and based on a reference hash value by if the substream is independent, using, as the reference hash value, a hash value derived for the corresponding substream of the preceding temporal segment, the preceding temporal segment preceding the predetermined temporal segment in the sequence of temporal segments; and/or if the substream depends on one or more reference substreams out of the number of substreams, the reference hash value is based on one or more of the following if the predetermined temporal segment is the first temporal segment of the sequence of temporal segments, and/or if a preceding temporal segment, which directly precedes the predetermined temporal segment in the sequence of temporal segments is unverifiable, a bitstring of bits of a predetermined value, the bitstring comprising a predetermined length, a hash value derived for a predetermined substream of a preceding temporal segment, the preceding temporal segment preceding the predetermined temporal segment in the sequence of temporal segments, wherein the predetermined substream corresponds to the lowest ranked substream within a set out of the one or more reference substreams, a combination of hash values derived for a set of substreams of a preceding temporal segment, the preceding temporal segment preceding the predetermined temporal segment in the sequence of temporal segments, the set of substreams consisting of all reference substreams out of the one or more reference substreams, which are independent;

acquiring a digital signature based on the verification string, and inserting an indication of the digital signature in the video data stream.

17. A method for encoding a video into a video data stream, wherein the method comprises rendering the video data stream checkable on trustworthiness in units of temporal segments of a sequence of temporal segments of the video data stream, wherein the method comprises:

acquiring a number of substreams of a predetermined temporal segment of the temporal segments, each of the substreams having a portion of the predetermined temporal segment associated therewith, the number of substreams having an order defined among them;

acquiring dependency information, which indicates, for a substream of the number of substreams, whether the substream is independent or whether the substream depends on one or more reference substreams of the substream;

rendering the substream of the predetermined temporal segment checkable on trustworthiness by using a hash function to derive a hash value based on the portion of the predetermined temporal segment which is associated with the substream;

forming a verification string based on the hash value and based on a reference hash value by if the substream is independent, using, as the reference hash value, a hash value derived for the corresponding substream of the preceding temporal segment, the preceding temporal segment preceding the predetermined temporal segment in the sequence of temporal segments; and/or if the substream depends on one or more reference substreams out of the number of substreams, the reference hash value is based on one or more of the following if the predetermined temporal segment is the first temporal segment of the sequence of temporal segments, and/or if a preceding temporal segment, which directly precedes the predetermined temporal segment in the sequence of temporal segments is unverifiable, a bitstring of bits of a predetermined value, the bitstring comprising a predetermined length, a hash value derived for a predetermined substream of a preceding temporal segment, the preceding temporal segment preceding the predetermined temporal segment in the sequence of temporal segments, wherein the predetermined substream corresponds to the lowest ranked substream within a set out of the one or more reference substreams, a combination of hash values derived for a set of substreams of a preceding temporal segment, the preceding temporal segment preceding the predetermined temporal segment in the sequence of temporal segments, the set of substreams consisting of all reference substreams out of the one or more reference substreams, which are independent;

acquiring a digital signature based on the verification string, and inserting an indication of the digital signature in the video data stream.

18. A non-transitory digital storage medium having stored thereon a video data stream comprising a video, wherein the video is encoded into the video data stream using a method for encoding a video into a video data stream, wherein the method comprises rendering the video data stream checkable on trustworthiness in units of temporal segments of a sequence of temporal segments of the video data stream, wherein the method comprises:

acquiring a number of substreams of a predetermined temporal segment of the temporal segments, each of the substreams having a portion of the predetermined temporal segment associated therewith, the number of substreams having an order defined among them;

acquiring dependency information, which indicates, for a substream of the number of substreams, whether the substream is independent or whether the substream depends on one or more reference substreams of the substream;

rendering the substream of the predetermined temporal segment checkable on trustworthiness by using a hash function to derive a hash value based on the portion of the predetermined temporal segment which is associated with the substream;

forming a verification string based on the hash value and based on a reference hash value by if the substream is independent, using, as the reference hash value, a hash value derived for the corresponding substream of the preceding temporal segment, the preceding temporal segment preceding the predetermined temporal segment in the sequence of temporal segments; and/or if the substream depends on one or more reference substreams out of the number of substreams, the reference hash value is based on one or more of the following if the predetermined temporal segment is the first temporal segment of the sequence of temporal segments, and/or if a preceding temporal segment, which directly precedes the predetermined temporal segment in the sequence of temporal segments is unverifiable, a bitstring of bits of a predetermined value, the bitstring comprising a predetermined length a hash value derived for a predetermined substream of a preceding temporal segment, the preceding temporal segment preceding the predetermined temporal segment in the sequence of temporal segments, wherein the predetermined substream corresponds to the lowest ranked substream within a set out of the one or more reference substreams, a combination of hash values derived for a set of substreams of a preceding temporal segment, the preceding temporal segment preceding the predetermined temporal segment in the sequence of temporal segments, the set of substreams consisting of all reference substreams out of the one or more reference substreams, which are independent;

acquiring a digital signature based on the verification string, and inserting an indication of the digital signature in the video data stream.

* * * * *